(12) United States Patent  
Yamashita

(10) Patent No.: US 10,493,754 B2  
(45) Date of Patent: Dec. 3, 2019

(54) LIQUID DISCHARGING APPARATUS

(71) Applicant: BROTHER KOGYO KABUSHIKI KAISHA, Nagoya-shi, Aichi-ken (JP)

(72) Inventor: Toru Yamashita, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/192,969

(22) Filed: Nov. 16, 2018

(65) Prior Publication Data

US 2019/0084298 A1 Mar. 21, 2019

Related U.S. Application Data

(62) Division of application No. 15/583,354, filed on May 1, 2017, now Pat. No. 10,131,139, which is a division  
(Continued)

(30) Foreign Application Priority Data

Sep. 30, 2014 (JP) .................. 2014-202316  
Sep. 30, 2014 (JP) .................. 2014-202318  
Sep. 30, 2014 (JP) .................. 2014-202319

(51) Int. Cl.  
*B41J 2/045* (2006.01)  
*H02M 1/36* (2007.01)  
*B41J 2/14* (2006.01)

(52) U.S. Cl.  
CPC ....... *B41J 2/04541* (2013.01); *B41J 2/04548* (2013.01); *B41J 2/04581* (2013.01);  
(Continued)

(58) Field of Classification Search  
CPC .................................................. B41J 2/04548  
See application file for complete search history.

(56) References Cited

U.S. PATENT DOCUMENTS 9,432,543 B2 8/2016 Choi  
9,636,908 B2 5/2017 Yamashita  
(Continued)

FOREIGN PATENT DOCUMENTS

JP 62-050180 A 3/1987  
JP 2008-132657 A 6/2008  
(Continued)

OTHER PUBLICATIONS

United States Notice of Allowance dated Dec. 29, 2016 received in related U.S. Appl. No. 14/870,360.  
(Continued)

*Primary Examiner* — Shelby L Fidler  
(74) *Attorney, Agent, or Firm* — Scully, Scott, Murphy & Presser, P.C.

(57) ABSTRACT

There is provided a liquid discharging apparatus configured to discharge liquid, including: a liquid discharging head including a driving element; a driving device configured to drive the driving element; a power unit; a switch configured to perform switching of voltage supply; and a controller. When the power unit is switched on, the controller causes a power supply voltage of the power unit to be raised up to a first voltage while checking the power supply voltage; and the controller controls the switch to start the voltage supply from the power unit to the driving device while the power supply voltage is being raised up to the first voltage; and under a condition that the voltage supply is started while the power supply voltage is being raised up to the first voltage, the controller controls the driving device to apply the voltage to the driving element.

2 Claims, 14 Drawing Sheets

TIMING OF RAISING POWER SUPPLY VOLTAGE

TIMING OF STARTING VOLTAGE SUPPLY TO DRIVER IC

Related U.S. Application Data of application No. 14/870,360, filed on Sep. 30, 2015, now Pat. No. 9,636,908.

(52) U.S. Cl.
CPC ....... *B41J 2/04586* (2013.01); *B41J 2/14233* (2013.01); *H02M 1/36* (2013.01); *B41J 2002/14491* (2013.01)

(56) References Cited

U.S. PATENT DOCUMENTS

| | | | |
|---|---|---|---|
| 2002/0171694 A1* | 11/2002 | Takayanagi | B41J 2/04518 347/5 |
| 2007/0216715 A1 | 9/2007 | Zhao et al. | |
| 2007/0229604 A1 | 10/2007 | Takizawa | |
| 2009/0085945 A1 | 4/2009 | Ito | |
| 2009/0295845 A1 | 12/2009 | Nakata | |
| 2010/0103212 A1 | 4/2010 | Tabata et al. | |
| 2012/0327150 A1 | 12/2012 | Takagi | |
| 2018/0361740 A1* | 12/2018 | Mukaiyama | B41J 2/04588 |

FOREIGN PATENT DOCUMENTS

| | | | | |
|---|---|---|---|---|
| JP | 2013-006363 A | | 1/2013 | |
| JP | 2018140569 A | * | 9/2018 | |
| JP | 2018158525 A | * | 10/2018 | ............ B41J 2/3558 |

OTHER PUBLICATIONS

United States Office Action dated Jun. 3, 2016 received in related U.S. Appl. No. 14/870,360.

United States Notice of Allowance dated Jul. 16, 2018 received in related U.S. Appl. No. 15/583,354.

United States Office Action dated Feb. 5, 2018 received in related U.S. Appl. No. 15/583,354.

* cited by examiner

TIMING OF RAISING POWER SUPPLY VOLTAGE

TIMING OF STARTING VOLTAGE SUPPLY TO DRIVER IC

VOLTAGE APPLIED TO ACTIVE PORTION

TIMING OF RAISING POWER SUPPLY VOLTAGE

TIMING OF STARTING VOLTAGE SUPPLY TO DRIVER IC

VOLTAGE APPLIED TO ACTIVE PORTION

TIMING OF RAISING POWER SUPPLY VOLTAGE

TIMING OF STARTING VOLTAGE SUPPLY TO DRIVER IC

VOLTAGE APPLIED TO ACTIVE PORTION

TIMING OF RAISING POWER SUPPLY VOLTAGE

TIMING OF STARTING VOLTAGE SUPPLY TO DRIVER IC

VOLTAGE APPLIED TO ACTIVE PORTION

LIQUID DISCHARGING APPARATUS

CROSS REFERENCE TO RELATED APPLICATION

This application is a divisional of U.S. application Ser. No. 15/583,354, filed on May 1, 2017 which is a divisional of U.S. application Ser. No. 14/870,360 filed on Sep. 30, 2015, now U.S. Pat. No. 9,636,908 issued on May 2, 2017, which claims priority from Japanese Patent Applications No. 2014-202316 filed on Sep. 30, 2014, No. 2014-202318 filed on Sep. 30, 2014 and No. 2014-202319 filed on Sep. 30, 2014 the disclosures of which are incorporated herein by reference in their entireties.

BACKGROUND

Field of the Invention

The present teaching relates to a liquid discharging apparatus configured to discharge a liquid.

Conventionally, in a liquid discharging apparatus such as an ink-jet printer, etc., during a power-up time wherein the apparatus is switched on, an operation is performed for raising the power supply voltage generated in a power supplying device (power unit) up to a target voltage required for using the apparatus. In this operation, generally, the power supply voltage is gradually raised while repeatedly performing checking of fluctuation in voltage and feedback control so as to prevent the power supply voltage from becoming unstable during the raising of voltage (while the voltage is being raised). Further, after the power supply voltage becomes stable at the target voltage, the voltage is applied to a driving element for discharging a liquid so as to perform preparatory operations including a flushing for nozzles, etc. Only when these preparatory operations are completed, the apparatus is in a usable state.

In relation to this situation, there is known a configuration wherein a pulsed signal (pulse signal) is applied to a piezoelectric element of an ink-jet head after the power supply voltage becomes stable at a reference voltage. Note that the purpose of the pulse signal is to prevent any sudden electric charging of the piezoelectric element when the printer is powered up, and thus is not exactly same as the purpose of the above-described preparatory operations such as flushing, etc., performed after the power supply voltage is stabilized.

SUMMARY

In the recent years, particularly in the art of the ink-jet printer, there is a demand to shorten a time period of time since the ink-jet printer (ink-jet recording apparatus) is powered on and until the apparatus is in a usable state. In reality, however, a certain time is required for performing the checking of the power supply voltage for the purpose of stabilizing the voltage, etc., performed during the raising of power supply voltage, which in turn imposes limitations on shortening the time after the apparatus is switched on and until the apparatus becomes usable. Further, the flushing is performed after the power supply voltage is raised and then the voltage is stabilized, as described above. Accordingly, the flushing cannot be performed until the power supply voltage is stabilized, which also in turn imposes limitations on shortening the time after the apparatus is switched on and until the apparatus becomes usable.

An object of the present teaching is to shorten the time since the apparatus is switched on and until the power supply voltage is stabilized.

According to a first aspect of the present teaching, there is provided a liquid discharging apparatus configured to discharge liquid, including:

a liquid discharging head having a nozzle, and a driving element configured to cause the liquid to be discharged from the nozzle;

a driving device configured to apply a voltage to the driving element to drive the driving element;

a power unit configured to generate the voltage to be applied to the driving device to drive the driving element;

a switch configured to perform switching of voltage supply by which the voltage is supplied from the power unit to the driving device; and a controller configured to:

control the power unit to raise a power supply voltage of the power unit up to a first voltage while checking the power supply voltage, under a condition that the power unit is activated;

control the switch to start the voltage supply from the power unit to the driving device while the power supply voltage is being raised up to the first voltage; and control the driving device to apply the voltage supplied from the power unit to the driving element, under a condition that the voltage supply from the power unit to the driving device is started while the power supply voltage is being raised up to the first voltage.

In the present teaching, the voltage supply to the driving device is started at an intermediate point of time during a period in which the power supply voltage of the power unit is being raised up to the first voltage. Further, at a point of time when the voltage supply to the driving device is started, the voltage supplied to the driving device is applied from the driving device to the plurality of driving element. For example, this voltage application state in which the voltage is applied from the driving device to the driving elements may be continuously maintained. When the power supply voltage is being raised, the power supply voltage fluctuates. However, in a case that the fluctuating voltage is applied to the driving elements, the voltage fluctuation is attenuated by the action of any resistance component(s) existing from the driving device to the driving elements. Namely, by applying the voltage to the driving elements while the power supply voltage is being raised, the fluctuation in the power supply voltage can be suppressed. Accordingly, it is possible to shorten the time since the time of power-on and until the power supply voltage is stabilized at the target first voltage; for example, it is possible to decrease the number of times for performing the checking of the voltage while the power supply voltage is being raised. Note that it is allowable that the checking of the voltage is performed only for one time.

Alternatively, under a condition that the voltage supply from the power unit to the driving device is started while the power supply voltage is being raised up to the first voltage, the controller may control the driving device to convert the voltage supplied from the power unit to a pulse signal, and to apply the pulse signal to the driving elements By applying the pulse signal to the driving elements while the power supply voltage is being raised, it is possible to impart energy to the ink inside the nozzles. Note that although the voltage level of the pulse signal applied to the driving elements is low while the power supply voltage is being raised, it is possible to impart energy to some extent to the liquid inside the nozzles. With this, it is possible to vibrate the meniscus in the nozzles, and to further discharge the liquid from the nozzles to some extent. Namely, it is possible to perform, in advance while the power supply voltage is being raised, a part or portion of the flushing which is conventionally performed after the power supply voltage has been raised and the voltage has been stabilized. Accordingly, it is possible to shorten the time for the flushing performed after the power supply voltage is stabilized, and consequently to shorten the time after the power is turned on and until the apparatus becomes usable.

According to a second aspect of the present teaching, there is provided a liquid discharging apparatus configured to discharge liquid, including:

a liquid discharging head having a nozzle, and a driving element configured to let the liquid discharge from the nozzle;

a driving device configured to apply a voltage to the driving element to drive the driving element;

a power unit configured to generate the voltage to be applied to the driving device to drive the driving element;

a switch configured to perform switching of voltage supply by which the voltage is supplied from the power unit to the driving device; and a controller configured to:
control the power unit to raise a power supply voltage of the power unit up to a first voltage in a stepped manner via a plurality of voltage-raising steps, under a condition that the power unit is activated;
control the switch to start the voltage supply from the power unit to the driving device while the power supply voltage is being raised up to the first voltage; and
control the driving device to apply the voltage supplied from the power unit to the driving element at a same time when a voltage-raising state of the power supply voltage proceeds to a final voltage-raising step, of the plurality of voltage-raising steps, in which the power supply voltage is raised to the first voltage.

According to a third aspect of the present teaching, there is provided a liquid discharging apparatus configured to discharge liquid, including:

a liquid discharging head having a nozzle, and a driving element configured to cause the liquid to be discharged from the nozzle;

a driving device configured to apply a voltage to the driving element to drive the driving element;

a power unit configured to generate the voltage to be applied to the driving device to drive the driving element;

a switch configured to perform switching of voltage supply by which the voltage is supplied from the power unit to the driving device; and a controller configured to:
control the power unit to raise a power supply voltage of the power unit up to a first voltage in a stepped manner via a plurality of voltage-raising steps, under a condition that the power unit is activated;
control the switch to start the voltage supply from the power unit to the driving device while the power supply voltage is being raised up to the first voltage; and
control the driving device to apply the voltage supplied from the power unit to the driving element immediately after the voltage-raising state has proceeded to a final voltage-raising step, of the plurality of voltage-raising steps, in which the power supply voltage is raised to the first voltage.

In these cases, when the power unit of the liquid discharging apparatus is activated (switched on or powered up), the controller raises the power supply voltage generated by the power unit up to the predetermined first voltage in a stepped manner via the plurality of voltage-raising steps. Here, the voltage-raising proceeds to the final voltage-raising step and in the moment that the power supply voltage is raised to the first voltage, the power supply voltage overshoots. This causes a large fluctuation, which in turn causes then the power supply voltage to fluctuate for a predetermined period of time. In the present teaching, the voltage is applied from the driving device to the driving elements at the same time when the voltage-raising proceeds to the final voltage-raising step or immediately after the voltage-raising has proceeded to the final voltage-raising step. Note that the phrase "the voltage is applied . . . to the driving elements immediately after the voltage-raising has proceeded to the final voltage-raising step" in the present teaching means that the voltage is applied to the driving elements before the voltage fluctuation occurring in the power supply voltage is attenuated and substantially vanishes (ceases to exist, becomes substantially 0 (zero)). The phrase "the voltage fluctuation occurring in the power supply voltage is attenuated and substantially vanishes" in the present teaching means that the voltage fluctuation is attenuated within ±3% of the applied voltage, for example.

BRIEF DESCRIPTION OF THE DRAWINGS

FIGS. 6A, 6B and 6C are each a power supply voltage raising timing chart in a first embodiment, wherein FIG. 6A depicts a timing of raising power supply voltage, FIG. 6B depicts a timing of starting voltage supply to a driver IC, and FIG. 6C depicts the change in voltage applied to an active portion of a piezoelectric actuator.

FIGS. 8A, 8B and 8C are each a power supply voltage raising timing chart in a second embodiment, wherein FIG. 8A depicts a timing of raising power supply voltage, FIG. 8B depicts a timing of starting voltage supply to a driver IC, and FIG. 8C depicts the change in voltage applied to an active portion of a piezoelectric actuator.

FIGS. 12A, 12B and 12C are each a power supply voltage raising timing chart in a third embodiment, wherein FIG. 12A depicts a timing of raising power supply voltage, FIG. 12B depicts a timing of starting voltage supply to a driver IC, and FIG. 12C depicts the change in voltage applied to an active portion of a piezoelectric actuator.

DESCRIPTION OF THE EMBODIMENTS

First Embodiment

Next, a first embodiment of the present teaching will be described, with reference to the drawings as appropriate. Note that the near side as viewed from the sheet surface of FIG. 1 is defined as the "upper side", the far side of the sheet surface of FIG. 1 is defined as the "lower side", and the following explanation will be based on the thus defined upper and lower sides.

Configuration of Printer

Figure 1:
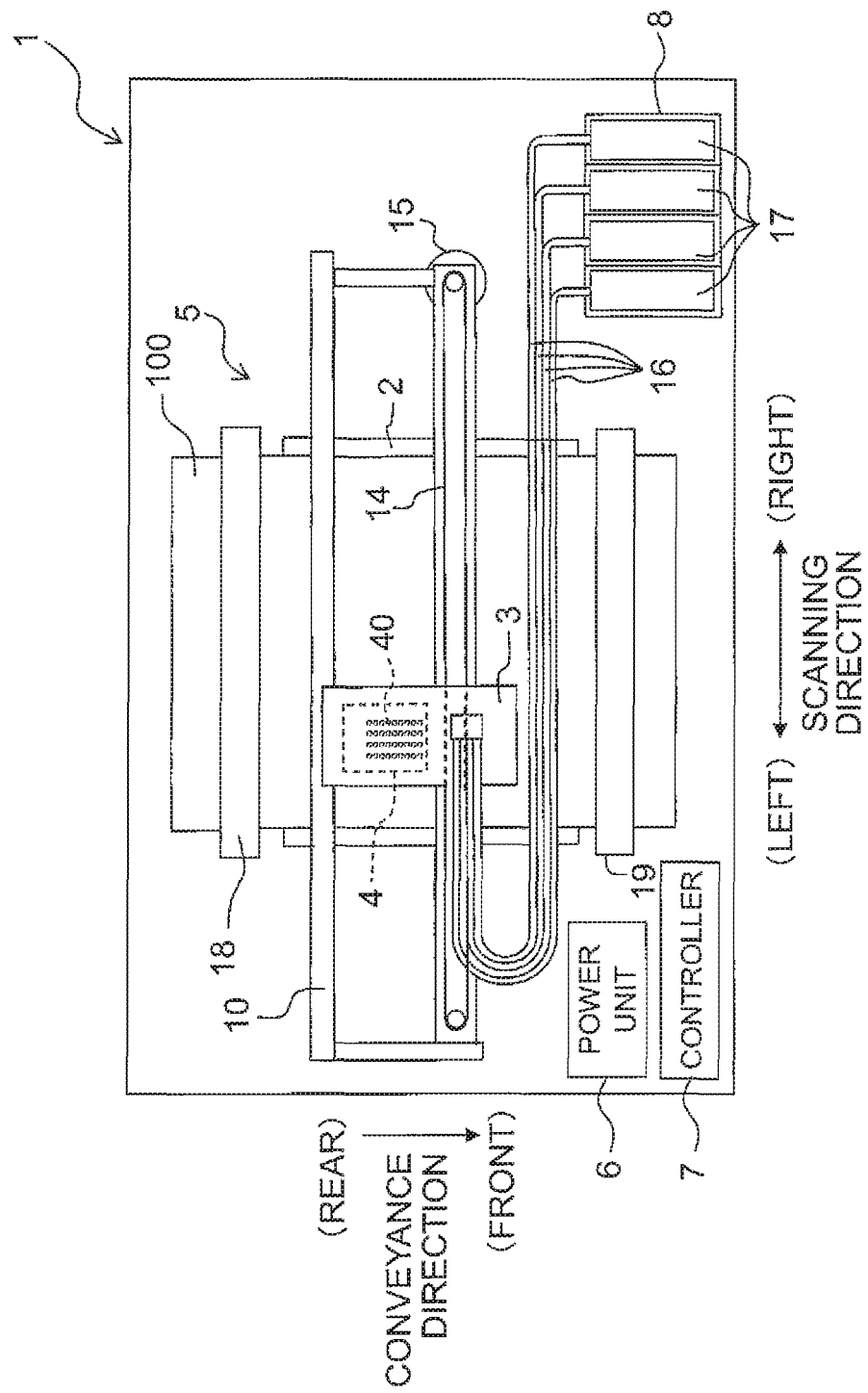
FIG. 1 is a schematic plane view of a printer according to an embodiment of the present teaching.

As depicted in FIG. 1, an ink-jet printer 1 includes a platen 2, a carriage 3, an ink-jet head 4, a conveyance mechanism 5, a power unit 6, a controller 7, etc.

On the upper surface of the platen 2, a recording paper 100 as a recording medium is placed. In a region facing the platen 2, the carriage 3 is configured to be reciprocatable in a left-right direction in FIG. 1 (hereinafter referred to as a "scanning direction") along two guide rails 10, 11. An endless belt 14 is connected to the carriage 3; and the endless belt 14 is driven by a carriage drive motor 15, thereby moving the carriage 3 in the scanning direction.

The ink-jet head 4 (the "liquid discharging head" in the present teaching) is attached to the carriage 3 and moves in the scanning direction together with the carriage 3. The ink-jet head 4 is connected, by tubes 16, to a cartridge holder 8 on which ink cartridges 17 for four colors (black, yellow, cyan and magenta) are installed. The ink-jet head 4 has a plurality of nozzles 40 which are formed on the lower surface (the surface on the far side of the sheet surface of FIG. 1) of the ink-jet head 4. Each of the nozzles 40 discharges or jets, toward the recording paper 100 placed on the platen 2, the ink supplied from an ink cartridge 17, among the four ink cartridges 17, corresponding thereto. The specific configuration of the ink-jet head 4 will be explained later on.

As depicted in FIG. 1, the conveyance mechanism 5 has two conveyance rollers 18, 19 arranged such that the platen 2 is arranged therebetween in a front-rear direction. The two conveyance rollers 18 and 19 are synchronously driven by a non-depicted conveyance motor. The conveyance mechanism 5 conveys the recording sheet 100 placed on the platen 2 in a conveyance direction, orthogonal to the scanning direction, by causing the conveyance motor to drive the two conveyance rollers 18, 19.

Figure 2:
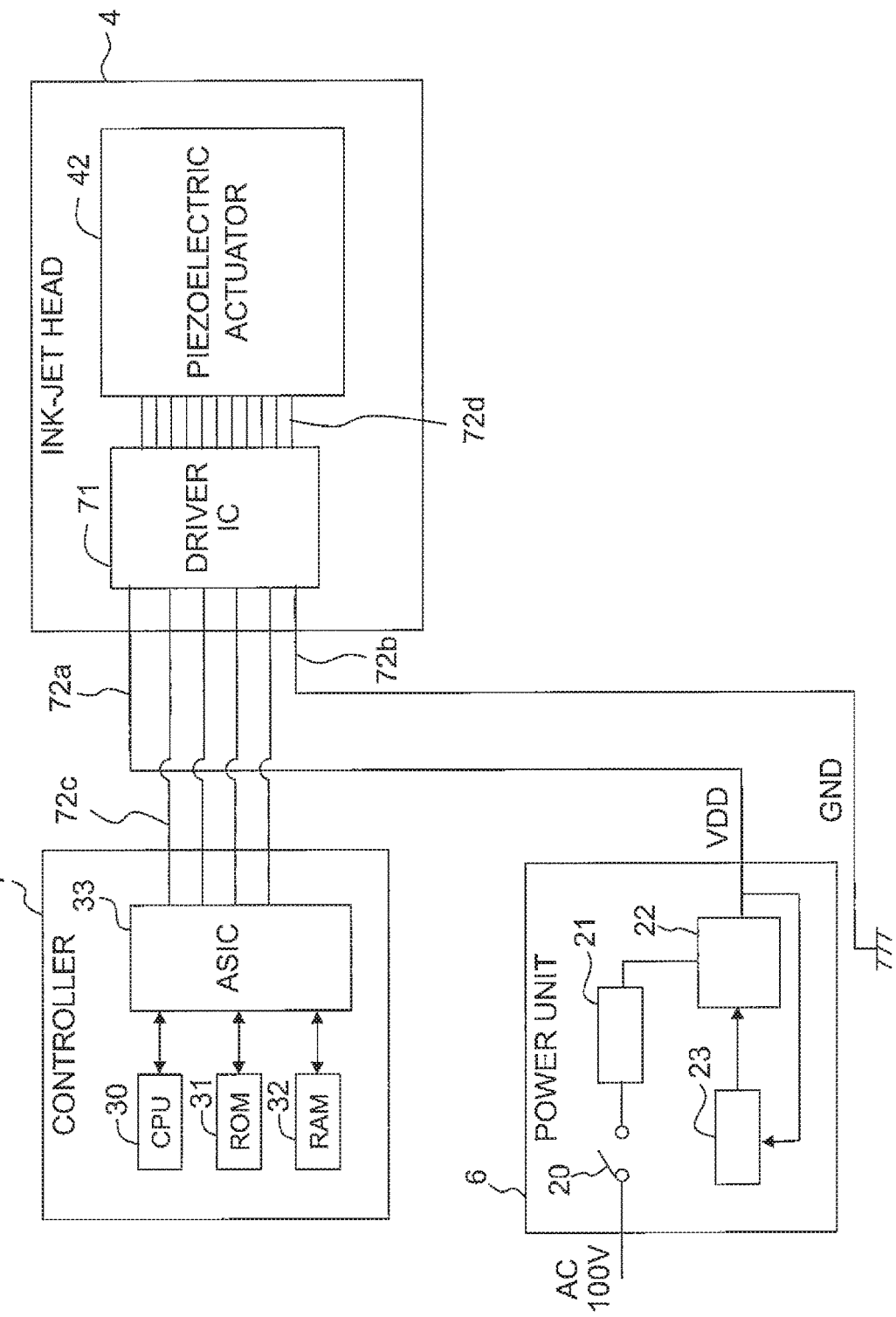
FIG. 2 is a block diagram schematically illustrating the electric configuration of the printer.

As depicted in FIG. 2, the power unit 6 has a power switch 20, a rectifier 21, a voltage generating circuit 22, a setting circuit 23, etc. The power switch 20 performs connection and shutting off with respect to a AC power source of 100V. The rectifier 21 converts the alternate current supplied from the AC power source to the direct current. Further, in doing so, the rectifier 21 lowers the voltage from 100V to a voltage lower than 100V (for example, to a voltage of about 30V). The direct current from the rectifier 21 is supplied to the voltage generating circuit 22. In the voltage generating circuit 22, a power supply voltage (VDD) of a predetermined voltage V1 (the "first voltage" in the present teaching) is generated. Further, the voltage generating circuit 22 also has a switching function for switching between supply/non-supply of the generated power supply voltage to a variety of devices, units, etc. constructing the printer 1. Namely, in this embodiment, the voltage generating circuit 22 is provided with a function as the "switching section" of the present teaching. The setting circuit 23 is a PWM circuit configured to set, with respect to the voltage generating circuit 22, a control target value for the feedback control for maintaining the power supply voltage to the predetermined voltage.

As depicted in FIG. 2, the controller 7 includes a CPU (Central Processing Unit) 30, a ROM (Read Only Memory) 31, a RAM (Random Access Memory) 32, an ASIC (Application Specific Integrated Circuit) 33 including various control circuits, etc. Further, the controller 7 is connected to a non-illustrated external apparatus such as a PC (personal computer) such that data communication can be performed between the controller 7 and the external apparatus.

The controller 7 performs various processes such as printing onto the recording paper 100, etc., by the CPU 30 and the ASIC 33 according to programs stored in the ROM 31. For example, in the printing process, based on a print command inputted from the external device such as the PC, the controller 7 controls the ink-jet head 4, the carriage drive motor 15, etc., so as to print an image etc. on the recording paper 100. Specifically, the controller 7 alternately performs an ink discharging operation in which the ink is discharged (jetted) while the ink-jet head 4 is moved in the scanning direction together with the carriage 3, and a conveyance operation in which the recording paper 100 is conveyed by a predetermined amount in the conveyance direction by the conveyance rollers 18, 19. Further, as will be described in detail later on, the controller 7 also performs control for raising the power supply voltage of the power unit 6 when the printer 1 is switched on.

Although the above explanation describes an example in which the controller 7 carries out various processes by the CPU 30 and the ASIC 33, the present teaching is not limited to this. The controller 7 may be achieved by any other configuration. For example, the processes may be performed by only the CPU or only the ASIC 33. Alternatively, the functions may be shared and achieved by two or more CPUs and/or two or more ASICs 33.

Detailed Configuration of Ink-Jet Head

Next, the ink-jet head 4 will be explained in detail. Note that in FIG. 3, a COF (Chip On Filter) 70 arranged to cover a piezoelectric actuator 42 is indicated by a two-dot-chain line so that FIG. 3 can be easily understood. Further, the illustration of the COF 70 is omitted in FIG. 4.

Figure 3:
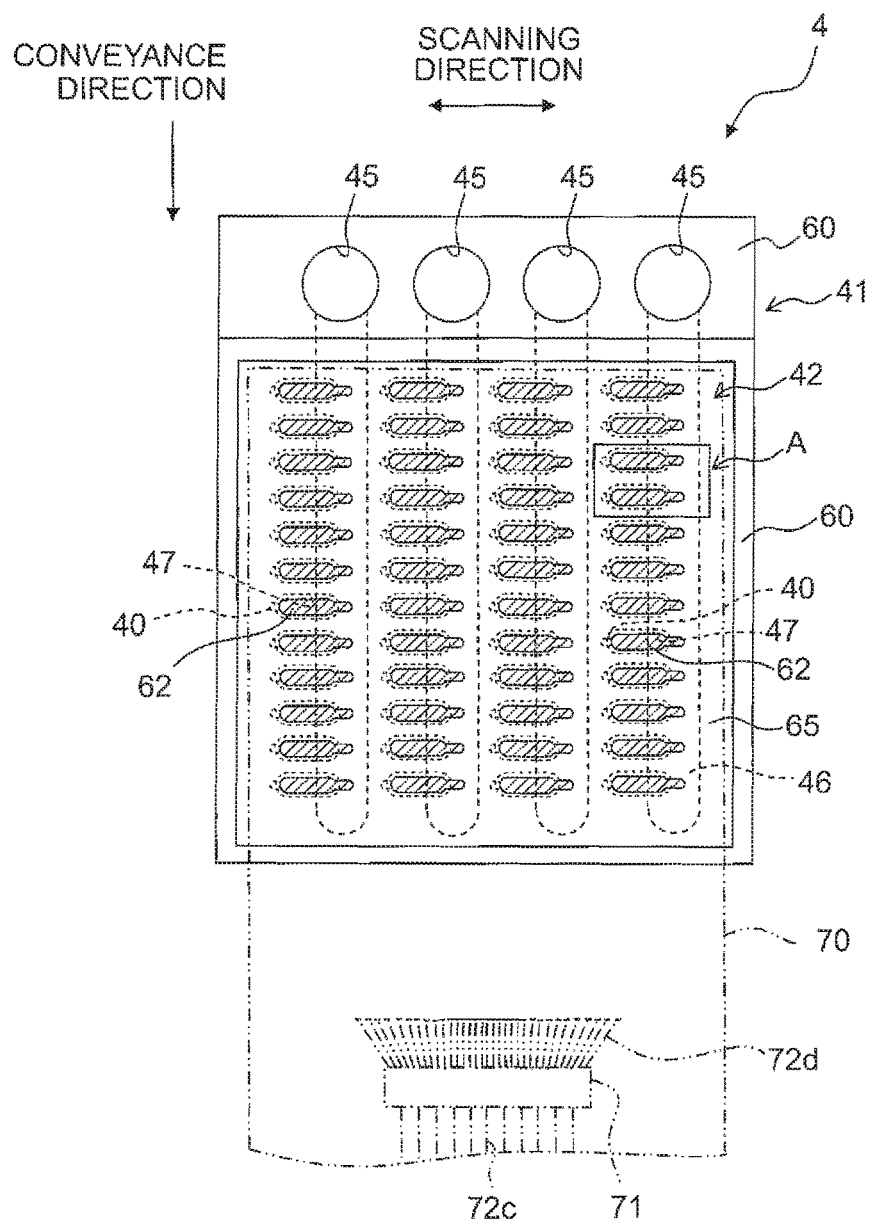
FIG. 3 is a top view of an ink-jet head.
Figure 4:
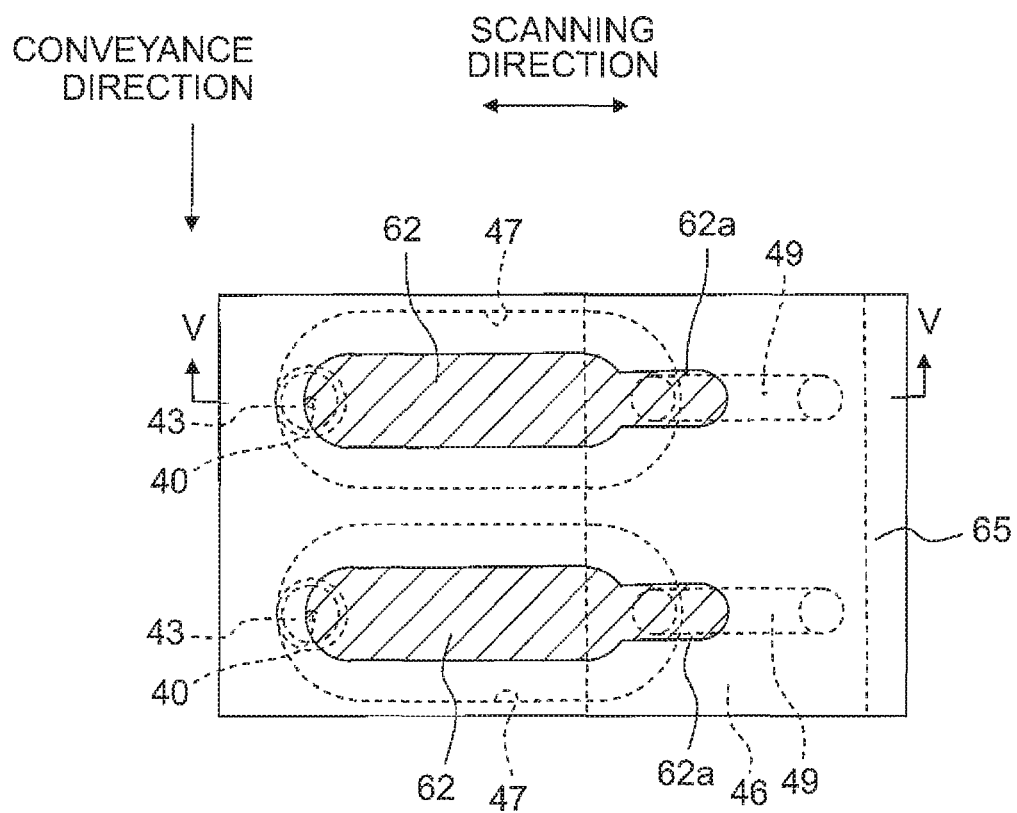
FIG. 4 is an enlarged view of a portion "A" in FIG. 3.
Figure 5:
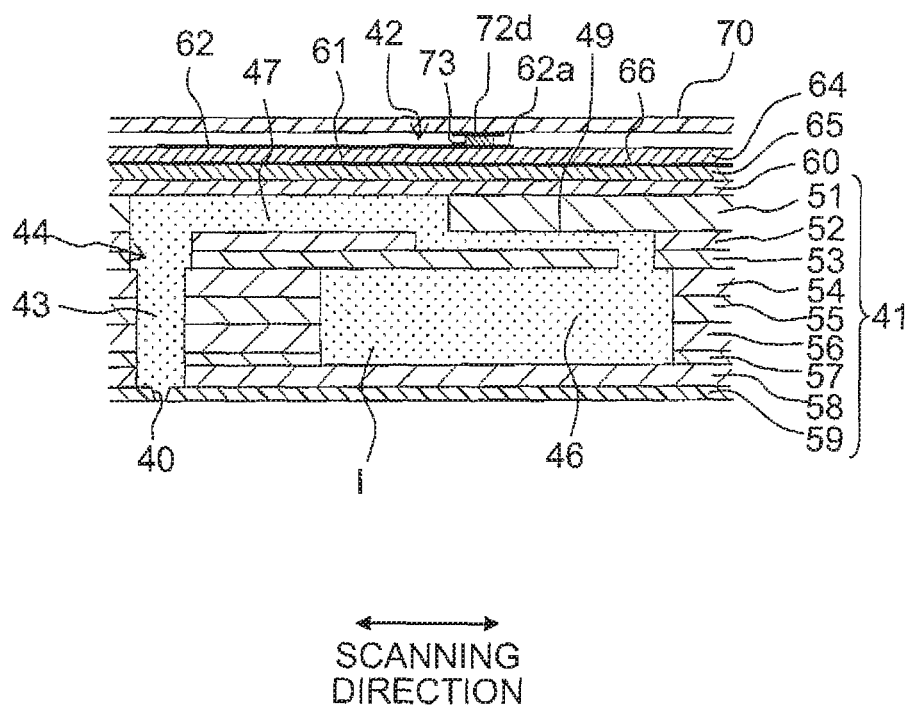
FIG. 5 is a cross-sectional view taken along a line V-V in FIG. 4.

As depicted in FIGS. 3 to 5, ink-jet head 4 is provided with a channel unit 41 and the piezoelectric actuator 42. Note that FIG. 5 depicts a state in which an ink (indicated by a reference symbol "I") is filled in an ink channel formed in the channel unit 41.

Channel Unit

As depicted in FIG. 5, the channel unit 41 has a structure in which a plurality of plates 51 to 59 are stacked on one another. The plates 51 to 59 are joined to one another with an adhesive in a state that the plates 51 to 59 are stacked on one another. Among the plates 51 to 59, the plate 59 as the lowermost layer is a nozzle plate formed of a synthetic resin such as polyimide, etc. The plurality of nozzles 40 are formed in the nozzle plate 59. The nozzles 40 are arranged in the conveyance direction, and also construct four nozzle rows arranged in the scanning direction. The four nozzle rows are configured to discharge the four color inks (black, yellow, cyan and magenta inks), respectively.

Each of the plates 51 to 58, which are different from the nozzle plate 59 and which construct the channel unit 41, is a plate made of a metallic material such as stainless steel, etc. These plates 51 to 58 have an ink channel formed in these plates and including a manifold 46 and pressure chambers 47, etc. which communicate with the nozzles 40 as will be described later on.

As depicted in FIG. 3, four ink supply holes 45 are formed in the plate 51 as the uppermost layer constructing the upper surface of the channel unit 41. The four color inks (black, yellow, cyan and magenta inks) are supplied to the four ink supply holes 45 from the four ink cartridges 17, respectively, of the holder 8 (see FIG. 1). Further, in FIG. 5, four manifolds 46, which are elongated (extended) in the conveyance direction, are formed in the plates 54 to 57 as the fourth to seventh plates from the top in the channel unit 41. The four ink supply holes 45 and the four manifolds 46 are connected to each other via communication holes (illustration thereof in the drawings is omitted) formed in the plates 52 and 53.

In the plate 51 as the uppermost layer in the channel unit 41, a plurality of pressure chambers 47 are formed to correspond to the plurality of nozzles 40, respectively. Each of the pressure chambers 47 is formed to have a substantially elliptical planar shape elongated in the scanning direction. The pressure chambers 47 are arranged in four rows corresponding to the four manifolds 46, respectively. The pressure chambers 47 are covered by a vibration plate 60 of the piezoelectric actuator 42. As depicted in FIGS. 4 and 5, a plurality of throttle channels 49 each connecting one of the manifolds 46 and one of the pressure chambers 47 corresponding thereto are formed in the plate 52 as the second plate from the top in the stacked plates of the channel unit 41. Further, communication channels 43 connecting the pressure chambers 47 and the nozzles 40, respectively, are formed in the seven plates in total that are the plates 52 to 58 located between the uppermost plate 51 and the nozzle plate 59.

The plates 51 to 59 explained above are joined to one another in the stacked state, thereby constructing the channel unit 41. Further, a plurality of individual channels 44, each branching from one of the manifolds 46 and arriving at one of the nozzles 40 via one of the throttle channels 49, one of the pressure chambers 47 and one of the communication channels 43, are formed in the channel unit 41.

Piezoelectric Actuator

The piezoelectric actuator 42 is arranged on the upper surface of the channel unit 41. As depicted in FIGS. 3 to 5, the piezoelectric actuator 42 is provided with the vibration plate 60, piezoelectric layers 64 and 65, a plurality of individual electrodes 62 and a common electrode 66.

This vibration plate 60 is joined to the upper surface of the channel unit 41 so as to cover the plurality of pressure chambers 47. The vibration plate 60 is made of, for example, a metallic material such as stainless steel, etc.

Each of the two piezoelectric layers 64 and 65 is made of a piezoelectric material. As the material forming the piezoelectric layers 64 and 65, it is possible to adopt lead zirconate titanate (PZT) that is a mixed crystal of lead titanate and lead zirconate. Other than the lead zirconate titanate, it is also possible to adopt a lead-free piezoelectric material such as barium titanate, a niobium-based piezoelectric material, etc. The piezoelectric layers 64 and 65 are joined to the upper surface of the vibration plate 60 in a state that the piezoelectric layers 64 and 65 are stacked onto each other.

The plurality of individual electrodes 62 are formed on the upper surface of the piezoelectric layer 64, that is the surface not facing (on the side opposite to) the piezoelectric layer 65, and arranged in the conveyance direction (arranging direction of the nozzles) so as to correspond to the pressure chambers 47, respectively. Each of the individual electrodes 62 has a substantially elliptical planar shape that is elongated in the scanning direction and is smaller to some extent than one of the plurality of pressure chambers 47 corresponding thereto; and each of the individual electrodes 62 is disposed to face a central portion of one of the pressure chambers 47 corresponding thereto. A connection terminal 62a is provided at one end portion in the longitudinal direction of each of the individual electrodes 62. On the upper surface of the piezoelectric layer 64, the connection terminal 62a extends in the scanning direction from the one end portion of the individual electrode 62, up to an area not facing the pressure chamber 47.

The common electrode 66 is arranged substantially entirely between the two piezoelectric layers 64 and 65. The common electrode 66 faces the respective individual electrodes 62 with the piezoelectric layer 64 disposed on the upper side of the common electrode 66 being intervened between the common electrode 66 and the respective individual electrodes 62. The common electrode 66 is electrically conducted with a non-illustrated connection terminal arranged on the upper surface of the piezoelectric layer 64.

Further, in the piezoelectric layer 64 depicted in FIG. 5, a portion sandwiched by each of the individual electrodes 62 and the common electrode 66 is particularly referred to as an active portion 61. The active portion 61 is polarized in a downward direction in a thickness direction of the active portion 16 (piezoelectric layer 64), namely in a direction from the individual electrode 62 toward the common electrode 66. Note that the active portion 61 which is sandwiched between each one of the individual electrodes 61 and the common electrode 66 corresponds to the "driving element" and the "piezoelectric element" in the present teaching.

As depicted in FIGS. 3 and 5, the COF (Chip On Film) 70 which is a wiring member is arranged on the upper surface of the piezoelectric actuator 42. The COF 70 electrically connects the controller 7 and the power unit 6 with the piezoelectric actuator 42 of the ink-jet head 4. Further, a driver IC 71 (the driving device of the present teaching) configured to drive the piezoelectric actuator 42 is mounted on the COF 70, and a plurality of wirings 72 are formed in the COF 70. As depicted in FIGS. 2 and 3, the plurality of wirings 72 of the COF 70 include a power line 72a via which the power supply voltage generated in the power unit 6 is supplied to the driver IC 71, a ground line 72b which connects the driver IC 71 to the ground, input wirings 72c via which a control signal is inputted from the ASIC 33 of the controller 7 to the driver IC 71, output wirings 72d via which a pulsed driving signal is outputted from the driver IC 71 to the piezoelectric actuator 42, etc.

As depicted in FIG. 5, an end portion of each of the output wirings 72d of the COF 70 is joined to the connection terminal 62a of one of the individual electrodes 62 with a bump 73. With this, the driver IC 71 of the COF 70 and the plurality of individual electrodes 62 of the piezoelectric actuator 42 are electrically connected. The driver IC 71 outputs, to each of the individual electrodes 62, a pulsed driving signal based on a control signal from the ASIC 33 of the controller 7, and the driver IC 71 switches the voltage to be applied to each of the individual electrodes 62 between a HIGH level (power supply voltage level supplied via the power line 72a) and a LOW level (ground level). Note that in the embodiment, the ASIC 33 of the controller 7 corresponds to the "controller" of the present teaching which controls the driver IC 71. The "controller" is referred to also as "driving controller" in some cases. Further, the ground line 72b of the COF 70 is connected to a non-illustrated connection terminal drawn from the common electrode 66 to the upper surface of the piezoelectric layer 64. Namely, the common electrode 66 is connected to the ground line 72b via the connection terminal, and is always maintained at the ground potential.

An operation performed by the piezoelectric actuator 42 for causing the ink to be discharged from the nozzles 40 is as follows. Firstly, provided that the voltage of a certain individual electrode 62 among the plurality of individual electrodes 62 is switched by the driver IC 71 from the LOW level (ground level) to the HIGH level (power supply voltage level). In this situation, difference in electric potential is generated between the certain individual electrode 62 and the common electrode 66, which in turn generates an electric field in the active portion 61 of the piezoelectric layer 64 corresponding to the certain individual electrode 62, in the thickness direction of the active portion 61. Here, since the polarization direction of the active portion 61 is the same as the direction of the electric field, the active portion 61 extends in the thickness direction as the polarization direction thereof and contracts in a planar direction. In accordance with the contraction deformation of the active portion 61, portions of the two piezoelectric layers 64 and 65 corresponding to the active portion 61 bend so as to bulge or project toward a certain pressure chamber 47 among the plurality of pressure chamber 47 corresponding to the active portion 61 (certain individual electrode 62). Consequently, the volume of the certain pressure chamber 47 is reduced and the pressure is applied to the ink inside the certain pressure chamber 47, thereby discharging a droplet of the ink (ink droplet) from a certain nozzle 40 among the plurality of nozzles 40 and communicating with the certain pressure chamber 47.

Next, voltage-raising control after the power is switched ON will be explained. In the printer 1 descried above, in a case that the power switch 20 (see FIG. 2) is turned ON by a user, the controller 7 performs an operation or process for raising the power supply voltage generated by the power unit 6 up to a predetermined target voltage V1. Here, if the power supply voltage is suddenly raised, there is such a fear that the power supply voltage might be unstable during a period of time in which the voltage is being raised, and thus the power supply voltage is raised in a stepped manner such that the power supply voltage is gradually raised. On the other hand, however, until the printer 1 is in a usable state after the printer 1 is switched ON, a variety of preparatory operations are further required, after the power supply voltage becomes stable at the target voltage V1, such as causing the ink-jet head 4 to perform flushing of the plurality of nozzles 40, etc. Thus, it is important to shorten the time required for raising the power supply voltage, for the purpose of shortening the time required after the printer 1 is switched ON for making the state of the printer 1 to be ready for starting any printing.

When the power switch 20 is turned ON, the controller 7 sends, to the power unit 6, a control command regarding the voltage raising of the power supply voltage, and controls the voltage generating circuit 22 of the power unit 6 to gradually raise the power supply voltage. Further, for example, in such a case that any printing is not performed for a long period of time, the printer 1 is shifted to a sleep mode. Also in a case that the printer 1 in the sleep mode receives a print command, the controller 7 sends to the power unit 6 the control command regarding the voltage raising of the power supply voltage, and the controller 7 controls the voltage generating circuit 22 of the power unit 6 to gradually raise the power supply voltage. Note that the controller 7 corresponds to the "controller" of the present teaching. The "controller" is referred to also as "power supply controller" in some cases. The voltage raising control of the power supply voltage by the controller 7 can be realized either by a software or by a hardware. Namely, the voltage raising control may be performed in such a manner that the CPU 30 performs an arithmetic processing by executing a program for the voltage raising control stored in the ROM 31, or the voltage raising control may be performed by a circuit for power supply control disposed in the controller 7. Alternatively, such a configuration is also allowable that the ASIC 33 performing the control of the driver IC 71, etc. also controls the power unit 6 as well.

Figure 6A:
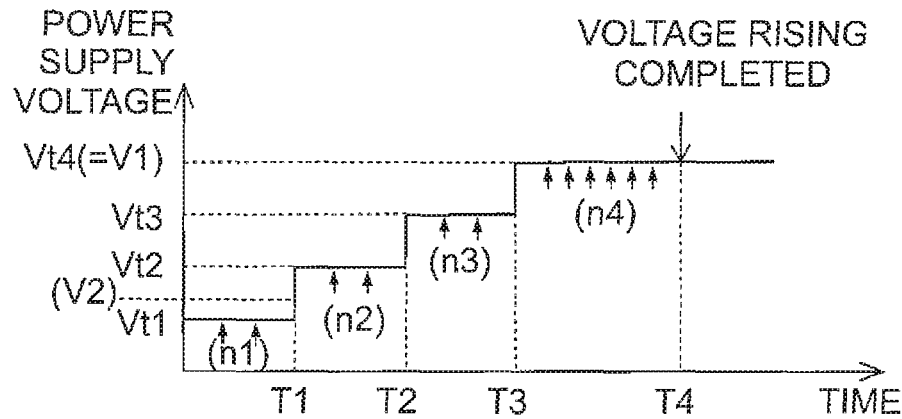

Next, the specifics of power supply voltage raising will be explained. In the first embodiment, the controller 7 causes the power supply voltage to be raised up to the target voltage V1 in a stepped manner (incrementally) via voltage raising steps of four stages for which control target values Vt (Vt1, Vt2, Vt3, Vt4 (=V1)) are set respectively, as depicted in FIG. 6A.

In each of the voltage-raising steps, regarding each of the four voltage raising steps, the controller 7 controls the setting circuit 23 such that the control target value Vt (one of the control target values Vt1, Vt2, Vt3, Vt4) set for each of the voltage raising steps is set as the voltage to be generated or raised by the voltage generating circuit 22. Then, the voltage generating circuit 22 raises the power supply voltage up to the control target value Vt; however, at this time, the power supply voltage outputted from the voltage generating circuit 22 fluctuates due to the backlash to the raised voltage. In view of this, the controller 7 performs checking of the power supply voltage outputted from the voltage generating circuit 22, and causes the voltage generating circuit 22 to perform feedback control based on a result of the checking. Further, this checking of the power supply voltage is repeated in each of the voltage-raising steps for a predetermined number of times n (n1, n2, n3 or n4) which is previously set individually for each of the voltage-raising steps. Note that the control target values Vt (Vt1, Vt2, Vt3, Vt4) and the number of times n (n1, n2, n3, n4) of the checking of voltage which are set for the voltage-raising steps, respectively, are stored in advance in the ROM 31 of the controller 7. Further, note that it is allowable that the number of times n for performing the checking of the voltage may be one time.

After the controller 7 performs the checking of the power supply voltage for the predetermined number of times n in each of the voltage-raising steps, the controller 7 causes the setting circuit 23 to change the target control value of the voltage-raising step to that of a next voltage-raising step to be performed after the voltage-raising step for which the voltage-raising has been performed, and makes the processing to proceed to the next voltage-raising step. Namely, as depicted in FIG. 6A, the controller 7 executes the four-stage voltage-raising steps in a shifted manner in the following order indicated below, thereby raising the power supply voltage.

(First Stage) Raising the voltage to Vt1, and performing the checking of the voltage for "n1" times; then (Second Stage) Raising the voltage to Vt2, and performing the checking of the voltage for "n2" times; then (Third Stage) Raising the voltage to Vt3, and performing the checking of the voltage for "n3" times; and then (Fourth Stage) Raising the voltage to Vt4, and performing the checking of the voltage for "n4" times.

The control target value Vt4 in the voltage-raising step of the fourth stage is the final target voltage V1 for the power supply voltage. In the voltage-raising step of the fourth stage, when n4 times of the checking of voltage are completed (time T4), the controller 7 judges that the power supply voltage is stabilized at the target voltage V1. Note that in this embodiment, the phrase "while the supply voltage is being raised" or "during the raising of power supply voltage" means a state before the power supply voltage is judged to be stabilized at the target voltage V1.

Figure 6B:
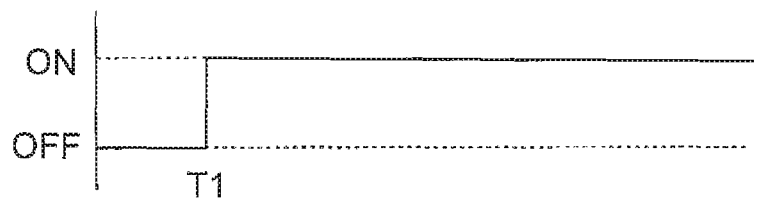
Figure 6C:
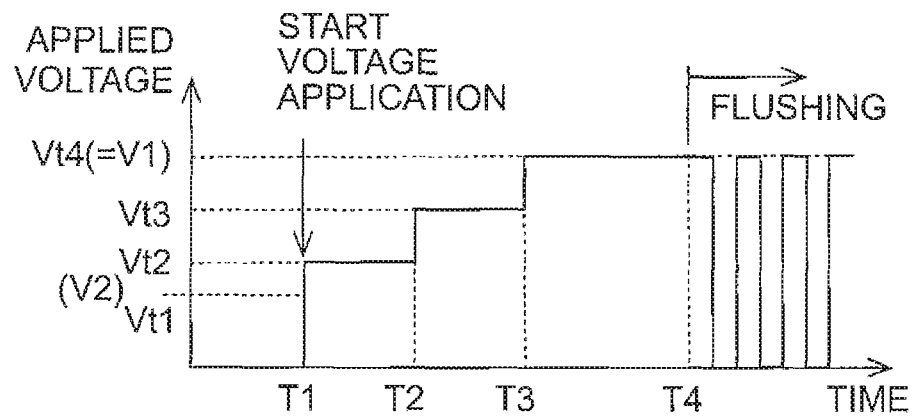

When the raising of the power supply voltage has been completed, the controller 7 causes the respective parts or sections of the printer 1 to perform a variety of preparatory operations. For example, the controller 7 causes the ink-jet head 4 to execute a so-called flushing for discharging, from the plurality of nozzles 40, ink droplets of the ink which is dried (thickening ink or ink having increased viscosity) inside the nozzles 40 while the printer 1 is stopped. More specifically, the ASIC 33 of the controller 7 transmits a control signal for executing the flushing to the driver IC 71. Then, as depicted in FIG. 6C, the driver IC 71 outputs a pulsed driving signal to each of the individual electrodes 62 of the piezoelectric actuator 42 so as to drive each of the active portions 61, thereby causing the ink to be discharged from the plurality of nozzles 40.

Next, the application of voltage to the piezoelectric actuator 42 while voltage is being raised will be explained. In the above-described voltage-raising steps, the checking of the power supply voltage is performed in each of the voltage-raising steps for the predetermined number of times so as to suppress any fluctuation in the voltage occurring when the power supply voltage is raised. Here, in a case that the fluctuation in voltage occurring when the voltage is raised can be reduced as small as possible, it is possible to reduce the number of times for performing the checking of the power supply voltage in each of the voltage raising steps, consequently making it possible to shorten the entire time required for raising the power supply voltage. Thus, the present embodiment performs the following control so as to suppress the fluctuation in the power supply voltage occurring when the voltage is raised.

Namely, while the power supply voltage is being raised, the application of voltage from the power unit 6 to the driver IC 71 is started, and then the voltage is applied from the driver IC 71 to the active portion(s) 61 of the piezoelectric actuator 42. Specifically, as depicted in FIGS. 6A to 6C, when the processing proceeds to the second step (time T1) for raising the power supply voltage to the voltage Vt2, the controller 7 controls the voltage generating circuit 22 of the power unit 6 so that the voltage generating circuit 22 starts to supply, to the driver IC 71, the power supply voltage for driving the piezoelectric actuator 42. Further, at the same time when the supply of voltage to the driver IC 71 is started, the controller 7 controls the driver IC 71 so that the voltage is applied from the driver IC 71 to a certain active portion 61 among the active portions 61 of the piezoelectric actuator 42. As depicted in FIG. 6C, after the driver IC 71 has started to apply the voltage to the certain active portion 61, the driver IC 71 keeps applying (continuously applies) the voltage supplied from the power unit 6 to the certain active portion 61 until the voltage raising is completed (until the time T4). Note that in the driver IC 71, the voltage applied to the active portion 61 is not changed. However, the voltage applied to the active portion 61 via the driver IC 71 is raised in the stepped manner in accordance with the raising in the supplied power supply voltage.

In such a manner, when the power supply voltage fluctuates while the power supply voltage is being raised, the fluctuating voltage is continuously applied to the active portion 61 of the piezoelectric actuator 42. By doing so, the fluctuation of the power supply voltage is attenuated by the action of any resistance component(s) existing from the driver IC 71 to the active portion 61.

Figure 7:
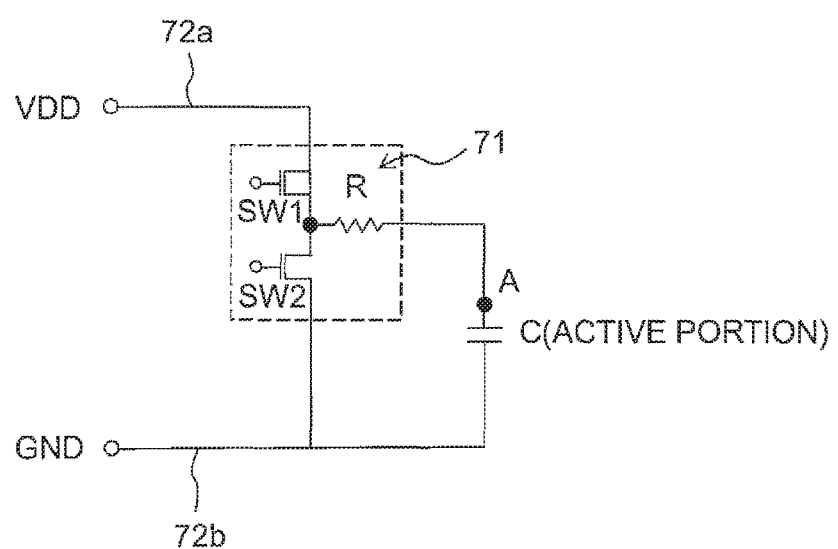
FIG. 7 is a diagram depicting one active portion among active portions of the piezoelectric actuator, and an equivalent circuit of the driver IC driving the active portion.

The power supply voltage-attenuating action described above will be explained in further detail. FIG. 7 is a diagram depicting one certain active portion 61 among the active portions 61 of the piezoelectric actuator 42, and an equivalent circuit of the driver IC 71 driving the certain active portion 61. At first, the certain active portion 61 of the piezoelectric actuator 42 which is formed of a piezoelectric material that is a ferroelectric substance stores the electric charge (accumulation or storage of electricity) when any potential difference is generated between the individual electrode 62 and the common electrode 66 by which the active portion 61 is sandwiched, and releases the stored electric charge when the potential difference is canceled (electric discharge). Namely, the active portion 61 can be considered as a capacitor C having a certain capacitance, as depicted in FIG. 7.

As depicted in FIG. 7, the driver IC 71 is a kind of switching circuit composed of a transistor. The driver IC 71 switches the ON/OFF of two switches SW1 and SW2 as depicted in FIG. 7, based on a control signal transmitted from the controller 7 via the input wirings 72c of the COF 70. With this, the voltage applied to the active portion 61 of the piezoelectric actuator 42 (the voltage at a point "A" in FIG. 7) is switched between the power supply voltage (VDD) and the ground (GND).

Here, a variety of resistance components exist in a route or path from the power unit 6 to the active portion 61 via the driver IC 71. For example, there are the resistance of the transistor constructing the switch SW1, there are resistance R of an outputting section outputting a driving signal, etc. which exist in the driver IC 71. Further, between the driver IC 71 and the individual electrode 62, the wiring resistance of the output wiring 72d of the COF 70, of the connection terminals 62a on the piezoelectric actuator 42, etc. Here, generally, in a case that the resistance components are great inside one circuit, then when the voltage applied to the circuit is changed, the rising time and fall time of the waveform of the voltage becomes longer, which in turn reduces the change in the voltage per unit time to be smaller. Thus in this embodiment, in a state that the power supply voltage is fluctuating, when the fluctuating voltage is applied to the active portion 61 via the driver IC 71, the above-described resistance components act in a direction for attenuating the fluctuation in voltage, thereby reducing the fluctuation in the power supply voltage. Namely, by continuously applying the voltage from the driver IC 71 to the active portion 61 while the supply voltage is being raised, the fluctuation in the power supply voltage can be suppressed.

Note that in this embodiment, an object (target) to which the voltage is to be applied while the power supply voltage is being raised is the active portion 61 (piezoelectric element). As described above, the active portion 61 repeats the accumulation of electricity and the discharge of electricity accompanying with the fluctuation in the voltage applied thereto, the active portion 61 has a kind of capacitive component (capacitive element C). Therefore, when the voltage is applied from the driver IC 71 to the active portion 61, it is possible to remove a high frequency component, which is included in the voltage fluctuation occurred in the power supply voltage, by the capacitive element C possessed by the active portion 61.

As described above, in a case that the fluctuation in the power supply voltage can be suppressed by continuously applying the voltage to the active portion 61 while the power supply voltage is being raised, it is possible to reduce the number of times for performing the checking of the power supply voltage in each of the voltage-raising steps. For example, as depicted in FIG. 6A, each of the number of times (n1, n2, n3) for performing the checking of the power supply voltage in one of the voltage-raising steps of the first to third stages is set to be smaller. On the other hand, in the voltage-raising step of the final and fourth stage for raising the power supply voltage to the final target voltage V1, it is important to stabilize the power supply voltage at the target voltage V1. Therefore, the checking of the power supply voltage at the voltage-raising step of the final and fourth stage is preferably performed for a number of times to a certain extent. Accordingly, the number of times for performing the checking is made to be small (is reduced) for each of the voltage-raising steps of the first to third stages, namely the intermediate stages, in which the control target value is smaller than that in the voltage-raising step of the fourth and final stage; and the number of times for performing the checking for the voltage-raising step of the final and fourth stage in which the control target value is the target voltage V1 is made to be greater than those in the voltage-raising steps of the first to third stages.

Alternatively, it is allowable to increase the width for raising the voltage in each of the voltage-raising steps to thereby reduce the number of the voltage-raising steps, instead of decreasing the number of times for performing the checking of the power supply voltage in each of the voltage-raising steps of the first to third stages.

In such a manner, by suppressing the fluctuation in the power supply voltage while the power supply voltage is being raised, it is possible to reduce the number of times for performing the voltage checking in each of the voltage-raising steps of the first to third stages or to reduce the number of the voltage-raising steps. Accordingly, it is possible to shorten the time since the power is turned ON until and power supply voltage is stabilized at the target voltage (time T4 in FIGS. 6A and 6C); consequently, it is possible to shorten the time until the state of the printer 1 becomes the usable state.

Note that in an IC generally, there exists the voltage (guarantee voltage) which is minimally required so that the driver IC operates normally. Accordingly, in the embodiment, in a case that the power supply voltage is less than the guarantee voltage of the driver IC 71 when the supply of power supply voltage to the driver IC 71 is started while the power supply voltage is being raised, there is such a fear that the driver IC 71 might not operate normally. For example, there is conceived such a case that the switching ON/OFF of the switches SW1 and SW2 constructed of the transistor might not be performed normally.

From the above-described viewpoint, it is not greatly preferred that the voltage is supplied to the driver IC 71 immediately after the power switch is turned ON and then the voltage-raising of the power supply voltage has been started. Accordingly, in the embodiment, the voltage supply to the driver IC 71 is allowed to start under a condition that the power supply voltage becomes not less than a guaranteed voltage V2 of the driver IC 71 (the second voltage of the present teaching) that is smaller than the target voltage V1, while the power supply voltage is being raised. Specifically, as depicted in FIGS. 6A and 6C, under a condition that the control target value Vt2 of the voltage-raising step of the second stage is higher than the guaranteed voltage V2 of the driver IC 71, then as depicted in FIG. 6B, the controller 7 causes the power unit 6 to start the voltage supply from the power unit 6 to the driver IC 71 when the processing proceeds to the voltage-raising step of the second stage (time T1).

In a case that the voltage is applied from the driver IC 71 simultaneously to a plurality of pieces of the active portion 61, the resistance contributing to the attenuation of voltage fluctuation in the power supply voltage is a composite value of a plurality of pieces of resistance of the resistance components from the driver IC 71 to the active portions 61 which are connected parallel to the driver IC 71. Since the active portions 61 are connected parallel with respect to the driver IC 71, the value of the resistance contributing to the attenuation of voltage fluctuation becomes smaller as the number of the active portions 61 to which the voltage is simultaneously applied is greater, which in turn lowering the effect of attenuating the voltage fluctuation. Accordingly, when the power supply voltage is being raised, it is preferred that the ASIC33 of the controller 7 causes the driver IC 71 to apply the voltage only to one active portion 61 among the plurality of active portions 61.

Further, in a case that the voltage is applied from the driver IC 71 to the active portions 61, the effect of attenuating the voltage fluctuation becomes greater as the resistance in the wiring from the driver IC 71 to the active portions 61 is greater. Accordingly, the voltage is preferably applied only to a certain active portion 61, among the plurality of active portions 61, connected to a wiring which is included in the plurality of wirings and in which resistance from the driver IC 71 is greatest among the plurality of wirings. In this embodiment, as depicted in FIG. 3, the COF 70 is drawn from the ink-jet head 4 toward the downstream side in the conveyance direction. Accordingly, there is provided a configuration wherein certain individual electrodes 62, among the plurality of individual electrodes 62, which are located at the upstream end in the conveyance direction (upper end in FIG. 3) are located farthermost from the driver IC 71 mounted on the COF 70, and the wiring resistance from the driver IC 71 to the certain individual electrodes 62 on the upstream end in the conveyance direction is higher than that regarding other individual electrodes 62. In view of this, while the power supply voltage is being raised, the driver IC 71 continuously applies the voltage to the certain individual electrodes 62 located at the upstream end in the conveyance direction and located farthermost from the driver IC 71.

Modification of First Embodiment

Next, an explanation will be given about modifications in which various changes are made to the first embodiment. Note that, however, any parts or components constructed in the same manner as in the first embodiment are designated with same reference numerals, and description thereof is omitted as appropriate.

In the first embodiment, as depicted in FIGS. 6B and 6C, the applying of the voltage from the driver IC 71 to the active portion 61 is started at the same time as when (time T1) the supplying of the voltage from the power unit 6 to the driver IC 71 is started. However, it is allowable to apply the voltage to the active portion 61 after a predetermined time has elapsed after the start of supplying of the voltage to the driver IC 71.

Second Embodiment

Next, an explanation will be given about a second embodiment of the present teaching. Note that, however, any parts or components constructed in the same manner as in the first embodiment are designated with same reference numerals, and description thereof is omitted as appropriate. In particular, the mechanical configuration of the printer 1 is same as that in the first embodiment, and thus any explanation for the printer 1 is omitted.

In the following, an explanation will be given about voltage-raising control after power-on in the second embodiment. In the printer 1 descried above, in a case that the power switch 20 (see FIG. 2) is turned ON by a user, the controller 7 performs an operation (process) for raising the power supply voltage generated by the power unit 6 up to a predetermined target voltage V1. Alternatively, in such a case that the printer 1 in the sleep mode receives a print command inputted thereto, the controller 7 also performs the operation for raising the power supply voltage generated by the power unit 6 up to the predetermined target voltage V1. Here, if the power supply voltage is suddenly raised, there is such a fear that the power supply voltage might be unstable during a period of time in which the voltage is being raised, and thus the power supply voltage is raised in a stepped manner such that the power supply voltage is gradually raised.

When the power switch 20 is turned ON, the controller 7 sends, to the power unit 6, a control command regarding the voltage raising of the power supply voltage, and controls the voltage generating circuit 22 of the power unit 6 to gradually raise the power supply voltage. Note that the controller 7 corresponds to the controller of the present teaching. The "controller" is referred to also as "power supply controller" in some cases. The voltage raising control of the power supply voltage by the controller 7 can be realized either by a software or by a hardware. Namely, the voltage raising control may be performed in such a manner that the CPU 30 performs an arithmetic processing by executing a program for the voltage raising control stored in the ROM 31, or the voltage raising control may be performed by a circuit for power supply control disposed in the controller 7. Alternatively, such a configuration is also allowable that the ASIC 33 performing the control of the driver IC 71, etc. also controls the power unit 6 as well.

Figure 8A:
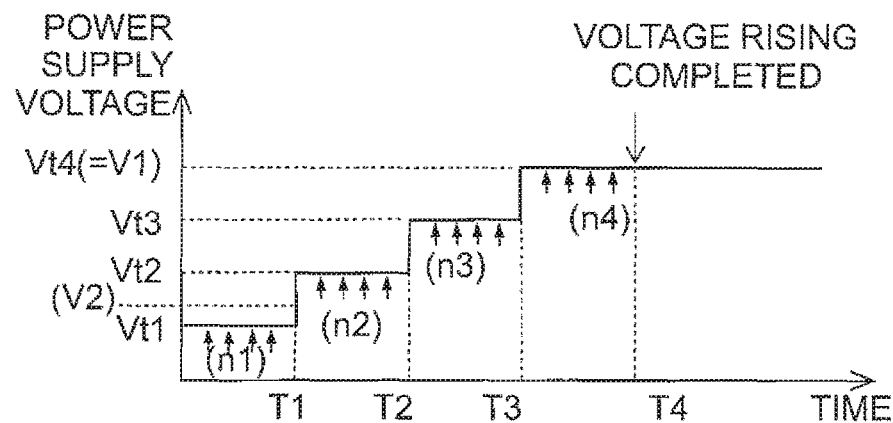

At first, the specifics of power supply voltage raising will be explained. In the second embodiment, the controller 7 causes the power supply voltage to be raised up to the target voltage V1 in a stepped manner (incrementally) via voltage raising steps of four stages for which control target values Vt (Vt1, Vt2, Vt3, Vt4 (=V1)) are set respectively, as depicted in FIG. 8A.

In each of the voltage-raising steps, regarding each of the four voltage raising steps, the controller 7 controls the setting circuit 23 such that the control target value Vt (one of the control target values Vt1, Vt2, Vt3, Vt4) set for each of the voltage raising steps is set as the voltage to be generated (raised) by the voltage generating circuit 22. Then, the voltage generating circuit 22 raises the power supply voltage up to the control target value Vt; however, at this time, the power supply voltage outputted from the voltage generating circuit 22 fluctuates due to the backlash to the raised voltage. In view of this, the controller 7 performs checking of the power supply voltage outputted from the voltage generating circuit 22, and causes the voltage generating circuit 22 to perform feedback control based on a result of the checking. Further, this checking of the power supply voltage is repeated in each of the voltage-raising steps for a predetermined number of times n (n1, n2, n3 or n4) which is previously set individually for each of the voltage-raising steps. Note that the control target values Vt (Vt1, Vt2, Vt3, Vt4) and the number of times n (n1, n2, n3, n4) of the checking of voltage which are set for the voltage-raising steps, respectively, are stored in advance in the ROM 31 of the controller 7.

After the controller 7 performs the checking of the power supply voltage for the predetermined number of times n in each of the voltage-raising steps, the controller 7 causes the setting circuit 23 to change the target control value of the voltage-raising step to that of a next voltage-raising step to be performed after the voltage-raising step for which the voltage-raising has been performed, and makes the processing to proceed to the next voltage-raising step. Namely, as depicted in FIG. 8A, the controller 7 executes the four-stage voltage-raising steps in a shifted manner in the following order indicated below, thereby raising the power supply voltage.

(First Stage) Raising the voltage to Vt1, and performing the checking of the voltage for "n1" times; then (Second Stage) Raising the voltage to Vt2, and performing the checking of the voltage for "n2" times; then (Third Stage) Raising the voltage to Vt3, and performing the checking of the voltage for "n3" times; and then (Fourth Stage) Raising the voltage to Vt4, and performing the checking of the voltage for "n4" times.

The control target value Vt4 in the voltage-raising step of the fourth stage is the final target voltage V1 for the power supply voltage. In the voltage-raising step of the fourth stage, when n4 times of the checking of voltage are completed (time T4), the controller 7 judges that the power supply voltage is stabilized at the target voltage V1.

Next, an explanation will be given about voltage application to the active portions when proceeding to the final voltage-raising step. When the power is turned ON, it is necessary to perform a variety of preparatory operations regarding the respective parts or sections of the printer 1, in addition to the above-described voltage-raising processing of the power supply voltage. An example of one of the preparatory operations is a flushing for discharging the ink from the respective nozzles 40 of the ink-jet head 4. In a case that the printer 1 is continuously in a stopped state, the ink inside each of the nozzles 40 is dried and the viscosity of the ink is increased. In view of this, when the printer 1 is powered up, the flushing is performed for each of the nozzles 40 to thereby discharge the ink having increased viscosity from each of the nozzles 40.

Conventionally, the preparatory operations including the flushing, etc., are performed after the power supply voltage is raised to the predetermined target voltage V1 and is stabilized. In such a case, the flushing cannot be performed until the raising of the power supply voltage is completed, and thus a time until the printer 1 is in a usable state is further needed corresponding for the waiting until the voltage raising is completed.

Accordingly, in the second embodiment, the controller 7 perform the following control so as to shorten the time period of time since the printer 1 powered on and until the printer 1 is in a usable state. Namely, when the voltage-raising proceeds to the final voltage-raising step wherein the power supply voltage is raised to the target voltage V1, the controller 7 drives the active portions 61 by utilizing the voltage fluctuation occurring in the power supply voltage. By driving the active portions 61 as described above, the energy can be imparted to the ink inside the nozzles 40 before the raising of the power supply voltage is completed, thereby shortening the time required for the flushing which is to follow the voltage-raising. This control will be explained in detail, as follows.

Figure 8B:
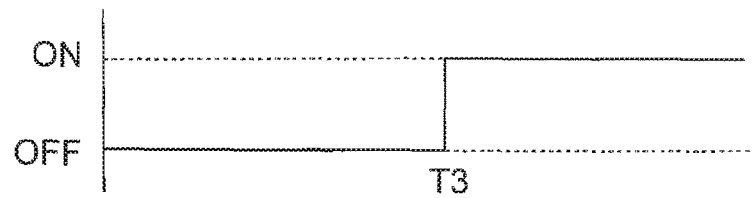
Figure 8C:
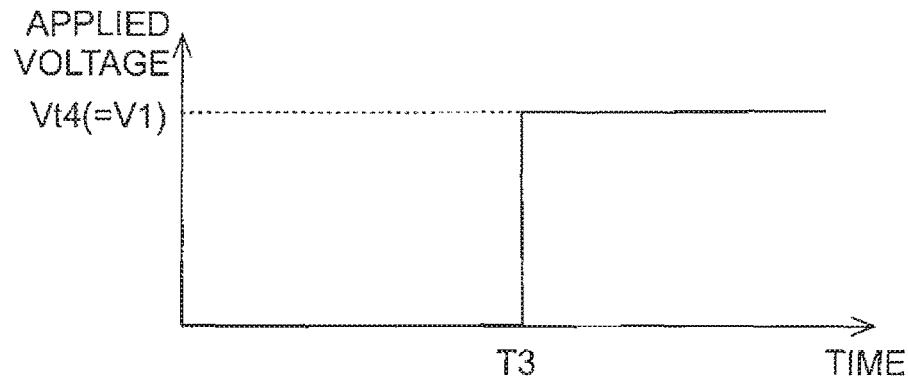

As depicted in FIGS. 8A to 8C, at first, the controller 7 controls the voltage generating circuit 22 of the power unit 6 while the power supply voltage is being raised so as to start the supplying of the power supply voltage from the power unit 6 to the driver IC 71. Note that in FIGS. 8A to 8C, the supplying of voltage (voltage supply) from the power unit 6 to the driver IC 71 is started at the moment that the voltage-raising of the power supply voltage proceeds to the final voltage-raising step of the fourth stage. It is allowable, however, to start the voltage supply at an earlier stage than this. Note that, however, in such a case that the voltage supply is started at an excessively early stage, there is a fear that the driver IC 71 might not operate normally if the voltage supplied to the driver IC 71 is low. Therefore, it is preferable that the voltage supply to the driver IC 71 is performed after the power supply voltage is raised at least to be not less than a predetermined voltage V2 (guarantee voltage) at which the driver IC 71 operates normally.

Figure 9:
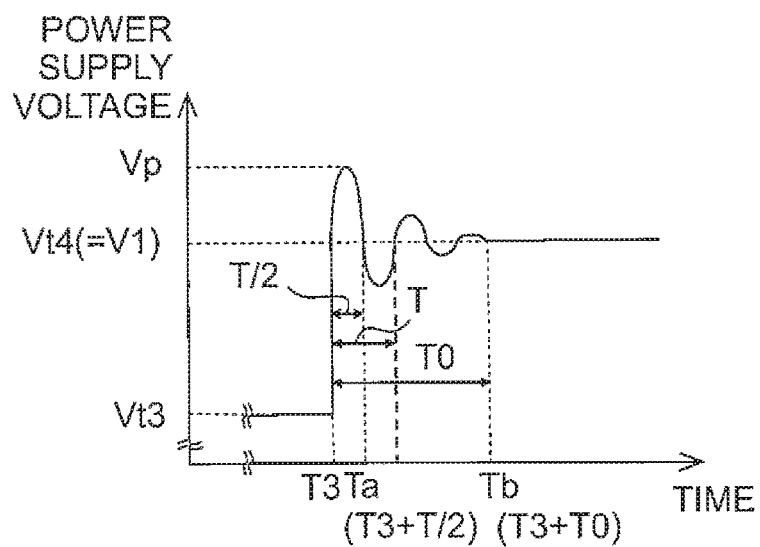
FIG. 9 depicts fluctuation in the power supply voltage when proceeding to a final voltage-raising step.

Further, the ASIC 33 of the controller 7 causes the driver IC 71 to apply the voltage to each of the plurality of active portions 61 of the piezoelectric actuator 42 at the same time when the voltage-raising state of the power supply voltage proceeds to the final voltage-raising step of the fourth stage, or immediately after the voltage-raising state has proceeded to the final voltage-raising step of the fourth stage, and the ASIC 33 causes the driver IC 71 to continue or maintain this state of voltage application. FIG. 9 depicts fluctuation in the power supply voltage when proceeding to the final voltage-raising step. As depicted in FIG. 9, at the moment that the power supply voltage is raised up to the target voltage V1, fluctuation or overshoot greatly exceeding the voltage V1 occurs in the power supply voltage, and then the power supply voltage fluctuates for a predetermined period of time. Therefore, in a case that the voltage supplied from the power unit 6 to the driver IC 71 is applied to the active portions 61 in a timing at which the above-described voltage fluctuation occurs in the power supply voltage, it is possible to allow the voltage applied to the active portions 61 to fluctuate as well, in response to the fluctuation in the power supply voltage.

The behavior of the active portions 61 when the voltage applied to the active portions 61 fluctuates is basically same as the case of applying the voltage to the active portions 61 when the ink is discharged. As described above, FIG. 7 is a diagram depicting one certain active portion 61 among the active portions 61 of the piezoelectric actuator 42, and an equivalent circuit of the driver IC 71 driving the certain active portion 61. At first, the certain active portion 61 of the piezoelectric actuator 42 which is formed of a piezoelectric material that is a ferroelectric substance stores the electric charge (accumulation or storage of electricity) when any potential difference is generated between the individual electrode 62 and the common electrode 66 by which the active portion 61 is sandwiched, and releases the stored electric charge when the potential difference is canceled (electric discharge). Namely, the active portion 61 can be considered as a capacitor C having a certain capacitance, as depicted in FIG. 7.

As depicted in FIG. 7, the driver IC 71 is a kind of switching circuit composed of a transistor. The driver IC 71 has a first switch SW1 and a second switch SW2 which are arranged between the ground line 72b and the power line 72a continued to the power unit 6. The first switch SW1 is a switch for applying the voltage to the active portion 61 to store the electricity in the active portion 61 (to charge the active portion 61), and the second switch SW2 is a switch for lowering the voltage of the active portion 61 to the ground and to discharge the electricity from the active portion 61.

In a case of discharging the ink from the nozzle 40, the driver IC 71 switches the ON/OFF of the two switches SW1 and SW2 as depicted in FIG. 7, based on a control signal transmitted from the controller 7 via the input wirings 72c of the COF 70. With this, the voltage applied to the active portion 61 (the voltage at a point "A" in FIG. 7) is switched between the power supply voltage (VDD) and the ground (GND). As explained above also regarding the operation of the piezoelectric actuator 42, when the voltage applied to the active portion 61 is changed, the active portion 61 contracts in the planar direction of the piezoelectric layer 64, thereby applying pressure to the ink inside the pressure chamber 47 corresponding to the active portion 61.

On the other hand, in a case that the voltage fluctuation occurs in the power supply voltage generated when the voltage-raising proceeds to the final voltage-raising step and that such a power supply voltage is supplied to the driver IC 71, the voltage applied to the active portion 61 fluctuates, even without switching the ON/OFF of the two switches SW1 and SW2 of the driver IC 71. In this case also, the active portion 61 contracts in the planar direction of the piezoelectric layer 64 depending on the fluctuation in the applied voltage, in a similar manner as in the case of switching the ON/OFF of the two switches SW1 and SW2 of the driver IC 71, and the pressure is applied to the ink inside the pressure chamber 47. With this, the meniscus of the nozzle 40 is vibrated, thereby shaking the ink which is located in the vicinity of the discharge port of the nozzle 40 and of which viscosity is increased, and making it possible to easily discharge the ink with the increased viscosity from the nozzle 40 by the flushing to be performed later. Alternatively, in a case that the meniscus of the ink can be destroyed by the shaking of the ink inside the nozzle 40, a portion or part of the ink with the increased viscosity can be discharged from the nozzle 40.

As depicted in Fig, 9, the fluctuation in the power supply voltage occurring when the voltage-raising proceeds to the final voltage-raising step is attenuated and becomes substantially 0 (zero) after a predetermined time (Ta) elapses. Therefore, the driving of the active portion 61 is temporary, and after the above-described time (Ta) has elapsed, the pressure is not applied to the ink inside the pressure chamber 47. Here, the phrase that "the fluctuation in the power supply voltage . . . becomes substantially 0 (zero)" may indicate, for example, a case that the fluctuation amplitude in the power supply voltage becomes not more than $1/10$, or a case that the fluctuation amplitude in the power supply voltage becomes not more than 5%. In the embodiment, however, it is important that the energy to some extent is applied to the ink before the power supply voltage is stabilized. Namely, only by applying the voltage from the driver IC 71 to the active portion 61 when the raising of the power supply voltage proceeds to the final voltage-raising step, it is possible to perform, in advance while the power supply voltage is being raised, a part or portion of the flushing which is conventionally performed after the power supply voltage has been stabilized. Accordingly, it is possible to shorten the time for the flushing performed after the power supply voltage is stabilized, and consequently to shorten the time after the power is turned on and until the printer 1 becomes usable.

Note that in FIG. 9, the application of the voltage from the driver IC 71 to the active portion 61 may be performed at the same time when the voltage-raising state of the power supply voltage proceeds to the final voltage-raising step, or may be performed after a slight time elapses since the voltage-raising state has proceeded to the final voltage-raising step.

In a case that the voltage application is performed at the same time (time T3) when the voltage-raising state of the power supply voltage proceeds to the final voltage-raising step, a peak voltage Vp of the overshoot generating in the power supply voltage can be applied to the active portion 61. Accordingly, the active portion 61 can be momentarily deformed greatly, thereby making it possible to apply a large pressure to the ink inside the nozzle 40.

On the other hand, in a case that the peak voltage Vp of the overshoot is considerably high, there is a fear that a voltage exceeding the rated voltage for the driver IC 71 might momentarily act on the driver IC 71, and that the driver IC 71 might be destroyed. Therefore, in a case that the peak voltage Vp is expected to exceed the rated voltage for the driver IC 71, the controller 7 preferably performs such a control that the voltage supply from the power unit 6 to the driver IC 71 and the voltage application from the driver IC 71 to the active portion 61 are performed immediately after the voltage-raising has proceeded to the final voltage-raising step, namely after a slight time elapses since the voltage-raising has proceeded to the final voltage-raising step.

Note that, however, if an excessively long time interval is provided between the proceeding to the final voltage-raising step until the application of the voltage to the active portion 61, the voltage fluctuation generated in the power supply voltage is attenuated and becomes substantially 0 (zero). Therefore, it is preferable that the voltage is applied to the active portion 61 before an attenuating time T0 of the voltage fluctuation elapses (during a period of time from time T3 up to a time Tb) after the voltage-raising state of the power supply voltage has proceeded to the final voltage-raising step. Further, in order to effectively utilize the voltage fluctuation in the power supply voltage while preventing the peak voltage Vp from acting on the driver IC 71, it is preferable that the voltage supply from the power unit 6 to the driver IC 71 and the voltage application from the driver IC 71 to the active portion 61 are performed after a time (T/2), that is half a period T of the fluctuation in the power supply voltage, elapses since the voltage-raising state of the power supply voltage has proceeded to the final voltage-raising step.

Note that the period T of the voltage fluctuation in the power supply voltage, the attenuating time T0 and the peak voltage Pv when the voltage-raising proceeds to the final voltage-raising step can be estimated (presumed) to some extent in advance based on the conditions such as the width for raising the voltage when the voltage raising proceeds to the final voltage-raising step. Accordingly, based on the result of estimation, it is possible to appropriately determine at which timing the voltage supply to the driver IC 71 and the voltage application from the driver IC 71 to the active portion 61 are to be performed. Note that the followings are examples of the peak voltage Vp, the period T of the voltage fluctuation, the attenuating time T0, etc. Provided that the control target value Vt3 in the third stage is Vt3=25V and the control target value Vt4 in the fourth stage is Vt4=V1=28V, then, for example, the peak voltage Vp is about 28.1 V, the period T is about several ns, and the attenuating time T0 is about several tens of ns.

As the number of the active portions 61, to which the voltage is simultaneously applied from the driver IC 71 when the voltage-raising proceeds to the final voltage-raising step, is greater, the electric current flowing due to the storage and discharge of the electricity by the active portions 61 fluctuates more greatly, and thus the ground potential momentarily fluctuates (shakes). This fluctuation (shaking) of the ground potential causes the voltage applied to the respective active portions 61 (the difference between the voltage applied to the individual electrodes 62 and the ground potential of the common electrode 66) to further fluctuate substantially, and thus a large energy can be imparted to the liquid inside the nozzles 40. Accordingly it is preferable that the ASIC 33 of the controller 7 causes the driver IC 71 to supply the voltage supplied from the power unit 6 to all of the active portions 61 as the driving elements.

Modification of Second Embodiment

Next, an explanation will be given about modifications in which various changes are made to the second embodiment. Note that, however, any parts or components constructed in the same manner as in the above-described second embodiment are designated with same reference numerals, and description thereof is omitted as appropriate.

In the second embodiment, although the voltage is applied from the driver IC 71 to the active portions 61 when the voltage-raising state of the power supply voltage proceeds to the final voltage-raising step, it is allowable that the voltage is applied to the active portions 61 in advance at a voltage-raising step which is performed one step before the final voltage-raising step.

Figure 10A:
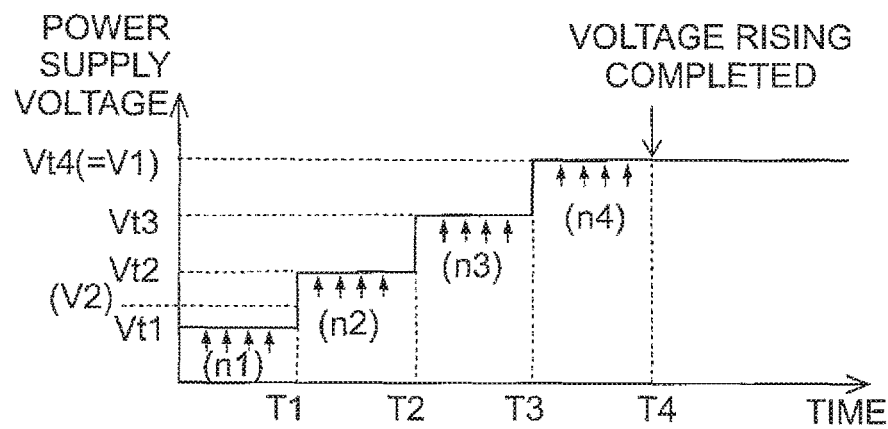
FIGS. 10A, 10B and 10C are each a power supply voltage raising timing chart of a modification of the second embodiment.
Figure 10B:
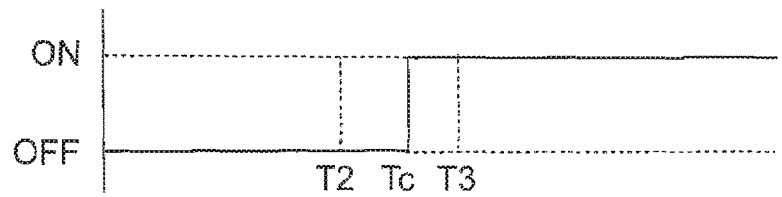
Figure 10C:
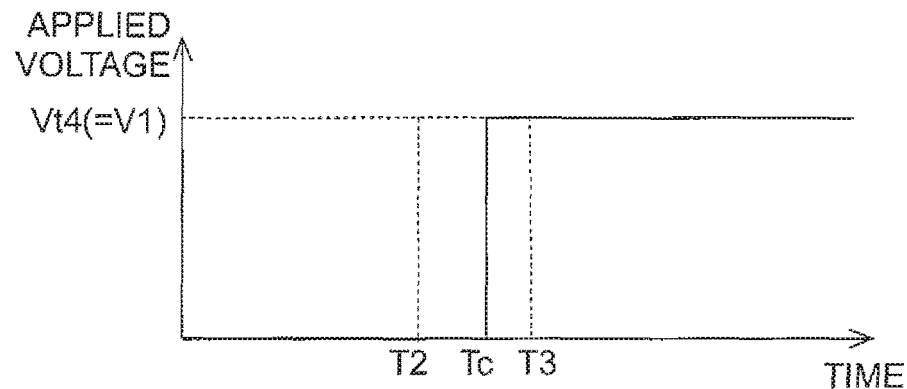

FIGS. 10A to 10C are each a timing chart for raising the power supply voltage of this modification. Firstly, the voltage-raising of the power supply voltage depicted in FIG. 10A is same as that in the second embodiment. Further, as depicted in FIGS. 10B and 10C, the power unit 6 is caused to start the voltage supply to the driver IC 71 and further the driver IC 71 is caused to apply the voltage to the active portions 61 during a time (time Tc) since the voltage-raising state of the power supply voltage has proceeded to the voltage-raising step of the third stage and before the voltage-raising state proceeds to the voltage-raising step of the fourth stage (between time T3 and time T4).

By applying the voltage to the active portions 61 in advance before the final voltage-raising step, it is possible to assuredly allow the large voltage fluctuation, generated due to the overshoot of the power supply voltage occurring when the voltage-raising proceeds to the final voltage-raising step, to act on the active portions 61. By doing so, it is possible to impart a large energy to the liquid inside the nozzles 40.

Figure 11A:
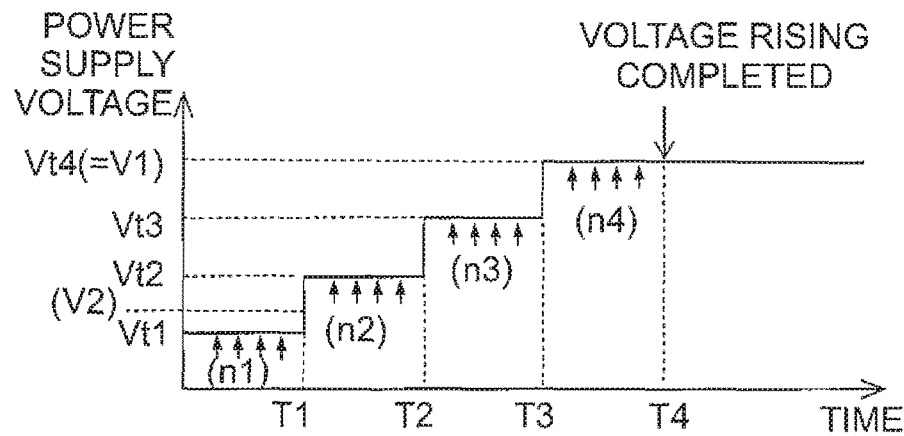
FIGS. 11A, 11B and 11C are each a power supply voltage raising timing chart of another modification of the second embodiment.
Figure 11B:
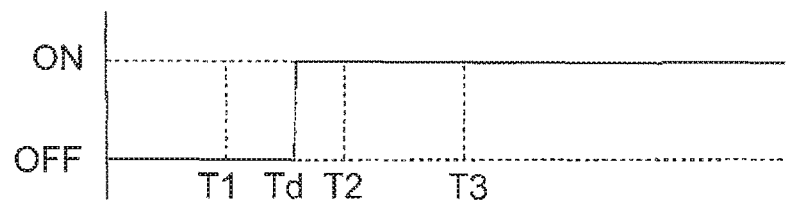
Figure 11C:
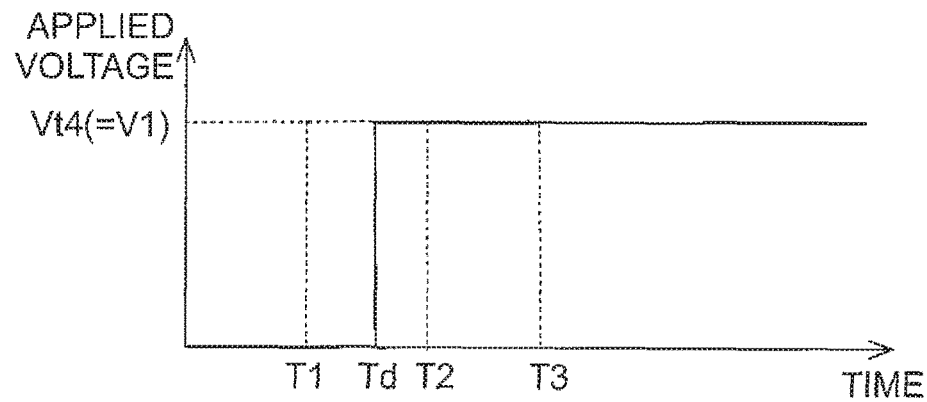

It is possible to utilize, not only the voltage fluctuation in the power supply voltage occurring when the voltage-raising proceeds to the final voltage-raising step, but also voltage fluctuation in the power supply voltage occurring in a voltage-raising step which is performed before the final voltage-raising step. For example, FIGS. 11A to 11C depict a case in which the supply of the voltage to the driver IC 71 and the application of the voltage from the driver IC 71 to the active portions 61 are started while the second voltage-raising step is being executed (namely, at time Td). Provided that the target control value Vt3 in the voltage-raising step of the third stage is a voltage capable of deforming the active portions 61 to some extent, it is allowable to also utilize the voltage fluctuation in the power supply voltage occurring when the voltage-raising proceeds to the voltage-raising step of the third stage as well, thereby making it possible to drive the active portions 61.

Third Embodiment

Next, an explanation will be given about a third embodiment of the present teaching. Note that, however, any parts or components constructed in the same manner as in the above-described first and second embodiments are designated with same reference numerals, and description thereof is omitted as appropriate. In particular, the mechanical configuration of the printer 1 is same as that in the first embodiment, and thus any explanation for the printer 1 is omitted.

An explanation will be given about voltage-raising control after power-on in the third embodiment. In the printer 1 descried above, in a case that the power switch 20 (see FIG. 2) is turned ON by a user, the controller 7 performs an operation (process) for raising the power supply voltage generated by the power unit 6 up to a predetermined target voltage V1. Alternatively, in such a case that the printer 1 in the sleep mode receives a print command inputted thereto, the controller 7 performs the operation for raising the power supply voltage generated by the power unit 6 up to the predetermined target voltage V. Here, if the power supply voltage is suddenly raised, there is such a fear that the power supply voltage might be unstable during a period of time in which the voltage is being raised, and thus the power supply voltage is raised in a stepped manner such that the power supply voltage is gradually raised.

When the power switch 20 is turned ON, the controller 7 sends, to the power unit 6, a control command regarding the voltage raising of the power supply voltage, and controls the voltage generating circuit 22 of the power unit 6 to gradually raise the power supply voltage. Note that the controller 7 corresponds to the controller of the present teaching. The "controller" is referred to also as "power supply controller" in some cases. The voltage raising control by the controller 7 can be realized either by a software or by a hardware. Namely, the voltage raising control may be performed in such a manner that the CPU 30 performs an arithmetic processing by executing a program for the voltage raising control stored in the ROM 31, or the voltage raising control may be performed by a circuit for power supply control disposed in the controller 7. Alternatively, such a configuration is also allowable that the ASIC 33 performing the control of the driver IC 71, etc. also controls the power unit 6 as well.

Figure 12A:
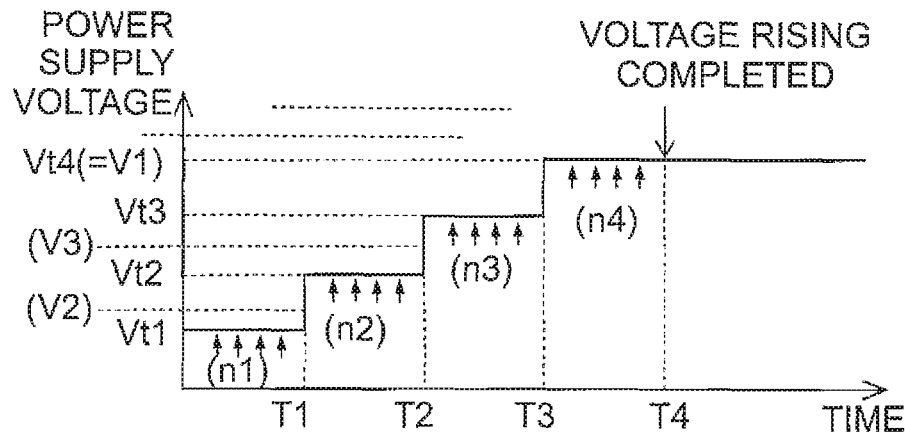

Next, the specifics of power supply voltage raising will be explained. In the third embodiment, the controller 7 causes the power supply voltage to be raised up to the target voltage V1 in a stepped manner (incrementally) via voltage raising steps of four stages for which control target values Vt (Vt1, Vt2, Vt3, Vt4 (=V1)) are set respectively, as depicted in FIG. 12A.

In each of the voltage-raising steps, regarding each of the four voltage raising steps, the controller 7 controls the setting circuit 23 such that the control target value Vt (one of the control target values Vt1, Vt2, Vt3, Vt4) set for each of the voltage raising steps is set as the voltage to be generated or raised by the voltage generating circuit 22. Then, the voltage generating circuit 22 raises the power supply voltage up to the control target value Vt; however, at this time, the power supply voltage outputted from the voltage generating circuit 22 fluctuates due to the backlash to the raised voltage. In view of this, the controller 7 performs checking of the power supply voltage outputted from the voltage generating circuit 22, and causes the voltage generating circuit 22 to perform feedback control based on a result of the checking. Further, this checking of the power supply voltage is repeated in each of the voltage-raising steps for a predetermined number of times n (n1, n2, n3 or n4) which is previously set individually for each of the voltage-raising steps. Note that the control target values Vt (Vt1, Vt2, Vt3, Vt4) and the number of times n (n1, n2, n3, n4) of the checking of voltage which are set for the voltage-raising steps, respectively, are stored in advance in the ROM 31 of the controller 7.

After the controller 7 performs the checking of the power supply voltage for the predetermined number of times n in each of the voltage-raising steps, the controller 7 causes the setting circuit 23 to change the target control value of the voltage-raising step to that of a next voltage-raising step to be performed after the voltage-raising step for which the voltage-raising has been performed, and makes the processing to proceed to the next voltage-raising step. Namely, as depicted in FIG. 12A, the controller 7 executes the four-stage voltage-raising steps in a shifted manner in the following order indicated below, thereby raising the power supply voltage.

(First Stage) Raising the voltage to Vt1, and performing the checking of the voltage for "n1" times; then (Second Stage) Raising the voltage to Vt2, and performing the checking of the voltage for "n2" times; then (Third Stage) Raising the voltage to Vt3, and performing the checking of the voltage for "n3" times; and then (Fourth Stage) Raising the voltage to Vt4, and performing the checking of the voltage for "n4" times.

The control target value Vt4 in the voltage-raising step of the fourth stage is the final target voltage V1 for the power supply voltage. In the voltage-raising step of the fourth stage, when n4 times of the checking of voltage are completed (time T4), the controller 7 judges that the power supply voltage is stabilized at the target voltage V11. Note that in this embodiment, the phrase "while the supply voltage is being raised" or "during the raising of power supply voltage" means a state before the power supply voltage is judged to be stabilized at the target voltage V1.

Next, explanation will be given about application of pulse to the active portions 61 while the voltage is being raised.

When the power is turned ON, it is necessary to perform a variety of preparatory operations regarding the respective parts or sections of the printer 1, in addition to the above-described voltage-raising processing of the power supply voltage. An example of one of the preparatory operations is a flushing for discharging the ink from the respective nozzles 40 of the ink-jet head 4. In a case that the printer 1 is continuously in a stopped stated, the ink inside each of the nozzles 40 is dried and the viscosity of the ink is increased. In view of this, when the printer 1 is powered up, the flushing is performed for each of the nozzles 40 to thereby discharge the ink having increased viscosity from each of the nozzles 40.

Conventionally, the preparatory operations including the flushing, etc., are performed after the power supply voltage is raised to the predetermined target voltage V1 and is stabilized. In such a case, the flushing cannot be performed until the raising of the power supply voltage is completed, and thus a time until the printer 1 is in a usable state is further needed corresponding for the waiting until the voltage raising is completed. Accordingly, in the third embodiment, the controller 7 further perform the following control so as to shorten the time (period of time) since the printer 1 is powered on and until the printer 1 becomes usable (is in a usable state).

Namely, while the power supply voltage is being raised, a pulse signal is applied from the driver IC 71 to the active portions 61 to thereby drive the active portions 61. By driving the active portions 61 as described above, the energy can be imparted to the ink inside the nozzles 40 before the raising of the power supply voltage is completed, thereby shortening the time required for the flushing which is to follow the voltage-raising. This control will be explained in detail, as follows.

Figure 12B:
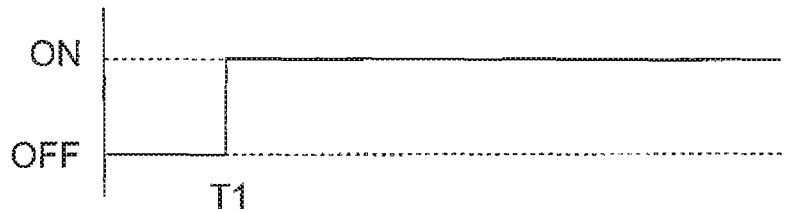
Figure 12C:
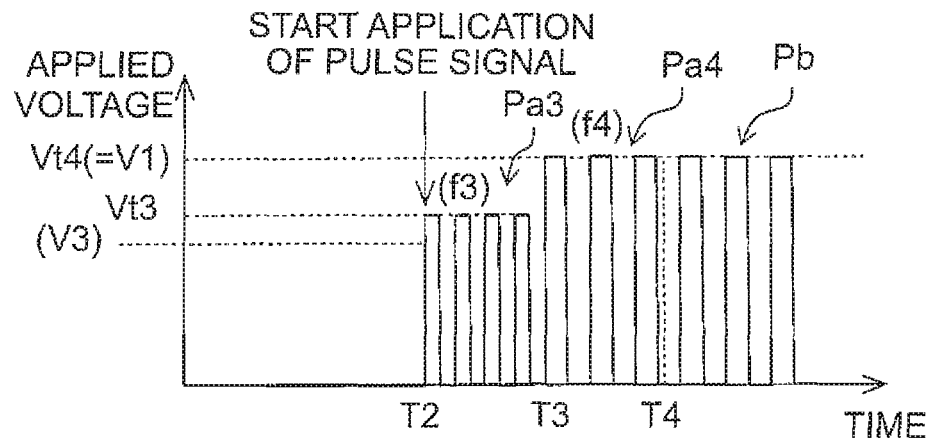

As depicted in FIGS. 12A to 12C, at first, the voltage supply from the power unit 6 to the driver IC 71 is started while the power supply voltage is being raised. Specifically, as depicted in FIGS. 12A and 12B, when the voltage-raising proceeds to the voltage-raising step of the second stage for raising the power supply voltage to the voltage Vt2 (time T1), the controller 7 controls the voltage generating circuit 22 of the power unit 6 so as to start the supplying of the power supply voltage, for driving the piezoelectric actuator 42, from the power unit 6 to the driver IC 71.

When the voltage supply from the power unit 6 to the driver IC 71 is started, the driver IC 71 converts the supplied voltage into a pulse signal, and applies the pulse signal to each of the plurality of active portions 61 of the piezoelectric actuator 42. Specifically, as depicted in FIGS. 12A and 12C, when the voltage-raising proceeds to the voltage-raising step of the third stage for raising the power supply voltage to the voltage Vt3 (time T2), the ASIC 33 of the controller 7 controls the driver IC 71 to apply the pulse signal to each of the active portions 61. Note that it is allowable to start the application of the pulse signal from the driver IC 71 to each of the plurality of active portions 61 at the same time when the voltage supply from the power unit 6 to the driver IC 71 is started. In the present teaching, however, the timing for applying the voltage to the active portions 61 is actively (deliberately) delayed. The reason for this delay will be explained later on.

The behavior (operation) of each of the active portions 61 when the pulse signal is applied to the active portion 61 will be explained. FIG. 7 is a diagram depicting one certain active portion 61 among the active portions 61 of the piezoelectric actuator 42, and an equivalent circuit of the driver IC 71 driving the certain active portion 61. At first, the certain active portion 61 of the piezoelectric actuator 42 which is formed of a piezoelectric material that is a ferroelectric substance stores the electric charge (accumulation or storage of electricity) when any potential difference is generated between the individual electrode 62 and the common electrode 66 by which the active portion 61 is sandwiched, and releases the stored electric charge when the potential difference is canceled (electric discharge). Namely, the active portion 61 can be considered as a capacitor C having a certain capacitance, as depicted in FIG. 7.

As depicted in FIG. 7, the driver IC 71 is a kind of switching circuit composed of a transistor. The driver IC 71 has a first switch SW1 and a second switch SW2 which are arranged between the ground line 72b and the power line 72a continued to the power unit 6. The first switch SW1 is a switch for applying the voltage to the active portion 61 to store the electricity, and the second switch SW2 is a switch for lowering the voltage of the active portion 61 to the ground and to discharge the electricity from the active portion 61.

The driver IC 71 switches the ON/OFF of the two switches SW1 and SW2 as depicted in FIG. 7, based on a control signal transmitted from the controller 7 via the input wirings 72c of the COF 70. The change in the voltage when the ON/OFF of these two switches SW1 and SW2 is switched at a certain time interval is a pulse signal Pa (Pa3, Pa4) applied to the active portion 61 (see FIG. 12C). When the pulse signal Pa is applied to the active portion 61, the voltage applied to the active portion 61 (the voltage at a point "A" in FIG. 7) is switched between the power supply voltage (VDD) and the ground (GND) at the certain time interval. As explained above also regarding the operation of the piezoelectric actuator 42, when the voltage applied to the active portion 61 is changed, the active portion 61 contracts in the planar direction of the piezoelectric layer 64, thereby applying pressure to the ink inside the pressure chamber 47 corresponding to the active portion 61.

Since the driver IC 71 generates the pulse signal to be applied to the active portion 61 by using the voltage supplied from the power unit 6, the voltage level of the pulse signal Pa applied to the active portion 61 while the power supply voltage is being raised is increased (raised), as the power supply voltage is raised to be higher. Specifically, as depicted in FIG. 12C, in the voltage-raising step of the third stage, the power supply voltage supplied to the driver IC 71 has not reached the target voltage V1, and thus the voltage applied from the driver IC 71 to the active portion 61 is low, and the voltage level of the pulse signal Pa3 is lower than the target voltage V1. On the other hand, in the voltage-raising step of the fourth stage, the power supply voltage supplied to the driver IC 71 is reaching closer to the target voltage V1 even if the power supply voltage fluctuates to some extent. Therefore, the voltage level of the pulse signal Pa4 in the voltage-raising step of the fourth stage is higher than the voltage level of the pulse signal Pa3 in the voltage-raising step of the third stage.

The energy can be imparted to the ink inside the nozzle 40 by applying the pulse signal to the active portion 61, corresponding to the nozzle 40, while the power supply voltage is being raised to thereby deform the active portion 61. Note that although the voltage level of the pulse signal Pa applied while the power supply voltage is being raised (in particular, the voltage level of the pulse signal Pa3 at the voltage-raising step of the third stage) is still in a low state, but expansion/contraction to some extent is generated in the active portion 61 when the pulse signal Pa is applied to the active portion 61, and thus it is possible to impart energy to some extent to the ink inside the nozzle 40. Namely, by vibrating the meniscus of the nozzle 40 with the energy imparted by the pulse signal Pa, it is possible to thereby shake the ink which is located in the vicinity of the discharge port of the nozzle 40 and of which viscosity is increased, and to make it possible to easily discharge the ink with the increased viscosity from the nozzle 40 by the flushing to be performed later. Alternatively, in a case that the meniscus of the ink can be destroyed by the shaking of the ink inside the nozzle 40, a portion or part of the ink with the increased viscosity can be discharged from the nozzle 40.

In such a manner, by applying the pulse signal to the active portion 61 while the power supply voltage is being raised to thereby vibrate the meniscus of the nozzle 40, or to thereby discharge the ink from the nozzle 40 even in a small amount, the ink with the increased viscosity can be easily discharged in the flushing to be performed after the raising of the power supply voltage is completed (time T4). Accordingly, in the flushing performed after the voltage-raising has been completed, it is possible to make the number of times for discharging the ink in the flushing (the number of times for performing the flushing) to be small for each of the nozzles 40, and to consequently shorten the time required for the flushing. Namely, this can also be considered that in the third embodiment, a part or portion of the flushing, which is conventionally performed after the raising of the power supply voltage has been completed (after the power supply voltage has been stabilized), is performed in advance while the power supply voltage is being raised. Accordingly, it is possible to shorten the time for the flushing performed after the power supply voltage is stabilized, and consequently to shorten the time after the power is turned on and until the printer 1 becomes usable.

Note that as described above, while the power supply voltage is being raised, the voltage level of the pulse signal Pa (in particular, the voltage level of the pulse signal Pa3 at the voltage-raising step of the third stage) applied from the driver IC 71 to the active portion 61 is also still in a low state. Accordingly, it is preferable that even a pulse signal having a low voltage level is capable of imparting a large energy to the liquid inside the nozzle 40. Specifically, it is preferable that the lowness of the voltage level of the pulse signal Pa having the low voltage level is compensated (supplemented) by increasing the number of pulses per unit time of the pulse signal Pa having the low voltage level. This makes it possible to impart a large energy to the liquid inside the nozzle 40 even with the pulse signal having a low voltage level. An example of this will be given in the following.

(1) While the power supply voltage is being raised, the ASIC 33 of the controller 7 causes the driver IC 71 to increase the number of pluses per unit time of the pulse signal Pa to be greater, as the voltage level of the pulse signal Pa is lower. Specifically, as depicted in FIG. 12C, when the voltage-raising proceeds to the voltage-raising step of the third stage, the driver IC 71 starts the application of the pulse signal Pa to the active portion 61. In this situation, the driver IC 71 makes a frequency f3 of the pulse signal Pa3 applied to the active portion 61 at the voltage-raising step of the third stage to be greater than a frequency f4 of the pulse signal Pa4 applied to the active portion 61 at the voltage-raising step of the fourth stage.

(2) Also in a case of discharging the ink from the nozzles 40 in a state that the power supply voltage has reached the voltage V1, the driver IC 71 applies a pulse signal (hereinafter referred to as "discharge pulse signal Pb") to the active portions 61. The discharge pulse signal Pb is, for example, a pulse signal which is applied to the active portions 61 when an image, etc. is recorded on the recording paper 100. Further, a pulse signal which is applied to the active portions 61 for the flushing performed after the raising of the power supply voltage has been completed, as depicted in FIG. 12C, is also included in the pulse signal Pb. When the discharge pulse signal Pb is applied, the power supply voltage is stabilized at the voltage V1, and thus the voltage level of the discharge pulse signal Pb is also in a high state. As compared with this discharge pulse signal Pb, the pulse signal Pa applied while the power supply voltage is being raised (in particular, the pulse signal Pa3 applied in the voltage-raising step of the third stage) does not have a high voltage level. Accordingly, the pulse signal Pa applied while the power supply voltage is being raised is allowed to have the number of pulses per unit time greater than that of the discharge pulse signal Pb.

Note that regarding an IC in general, there exists a voltage minimally required for a normal operation of the IC (guarantee voltage). Accordingly, in this embodiment, in a case that the supplying of the power supply voltage to the driver IC 71 is started while the power supply voltage is being raised and that the power supply voltage is less than the guarantee voltage for the driver IC 71, there is a fear that the driver IC 71 might not operate normally. For example, it is possible to presume such a case that the switching operation for switching the ON/OFF of the switches SW1 and SW2 each of which is constructed of a transistor cannot be performed normally, etc.

From this viewpoint, it is not desirable that the voltage supply to the driver IC 71 is performed immediately after the raising of the power supply voltage has been started following the power-on of the power switch 20. Accordingly, in the embodiment, the voltage supply to the driver IC 71 is started under the condition that while the power supply voltage is being raised, the power supply voltage becomes not less than the guarantee voltage V2 (the second voltage of the present teaching) which is lower than the target voltage V1. Specifically, as depicted in FIGS. 12A to 12C, in a case that the control target value Vt2 for the voltage-raising step of the second stage is higher than the guarantee voltage V2 for the driver IC 71, the controller 7 starts the voltage supply from the power unit 6 to the driver IC 71 when the voltage-raising proceeds to the voltage-raising step of the second stage (time T1).

Further, even in a state that the power supply voltage reaches the guarantee voltage V2 for the driver IC 71 and the driver IC 71 becomes operable, the voltage supplied to the driver IC 71 is still low. Thus, the responsiveness of each of the first switch SW1 for charging the active portions 61 and of the second switch SW2 for discharging the active portions 61 is not sufficient, and such a situation is conceivable that the reaction of each of the first and second switches SW1 and SW2 to the ON/OFF switching is delayed. If the response of each of the first and second switches SW1 and SW2 is delayed, there is a possibility that the voltage supplied from the power line 72*a* might be momentarily connected with the power line 72*a* and the ground line 72*b*, without being applied to the active portions 61. In view of this, the embodiment allows the driver IC 71 to apply the pulse signal to the active portions 61 when the power supply voltage becomes not less than a predetermined voltage V3 (the third voltage in the present teaching) which is higher than the second voltage V2 and lower than the target voltage V1.

Specifically, as depicted in FIG. 12A, provided that the voltage level V3 at which no problem occurs in the responsiveness of each of the switches SW1 and SW2 is higher than the control target value Vt2 for the voltage-raising step of the second stage and lower than the control target value Vt3 for the voltage-raising step of the third stage. In this case, when the raising of the power supply voltage proceeds to the voltage-raising step of the third stage (time T2), the power supply voltage becomes higher than the voltage V3. Accordingly, when the raising of the power supply voltage proceeds to the voltage-raising step of the third stage (time T2), the controller 7 causes the driver IC 71 to start the application of the pulse signal to the active portions 61. By doing so, since the first and second switches SW1 and SW2 are allowed to operate in a state that the voltage supplied from the power unit 6 becomes high and the responsiveness of each of the first and second switches SW1 and SW2 is improved, it is possible to prevent such a situation that the power line 72*a* is momentarily connected with the ground line 72*b*.

Modification of Third Embodiment

Next, an explanation will be given about modifications in which various changes are made to the above-described third embodiment. Note that, however, any parts or components constructed in the same manner as in the above-described third embodiment are designated with same reference numerals, and description thereof is omitted as appropriate.

In the third embodiment, as depicted in FIGS. 12B and 12C, the pulse signal is applied from the drive IC 71 to the active portions 61 after the voltage supply from the power unit 6 to the driver IC 71 has been started (time T1) and further then the power supply voltage has become not less than the voltage V3 (time T2). On the other hand, in such a case that there occurs no problem in the responsiveness of each of the first and second switches SW1 and SW2 provided that the supplied voltage is not less than the guarantee voltage V2 for the driver IC 71, then as depicted in FIGS. 13A to 13C, it is allowable to apply the pulse signal to the active portions 61, at the same time with the start of the voltage supply to the driver IC 71 when (at time T1) the voltage-raising proceeds to the voltage-raising step of the second stage and the power supply voltage becomes not less than the guarantee voltage V2.

Figure 13A:
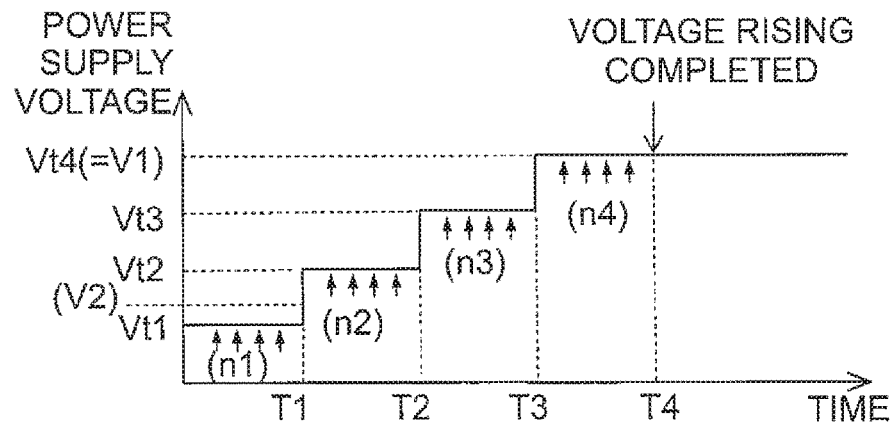
FIGS. 13A, 13B and 13C are each a power supply voltage raising timing chart of an modification of the third embodiment.
Figure 13B:
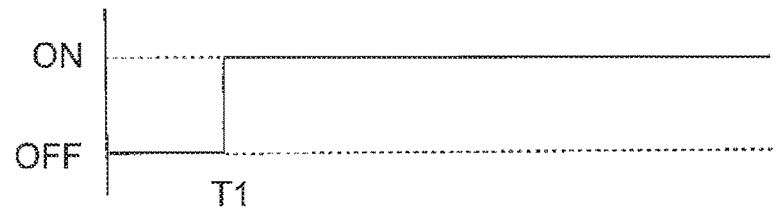
Figure 13C:
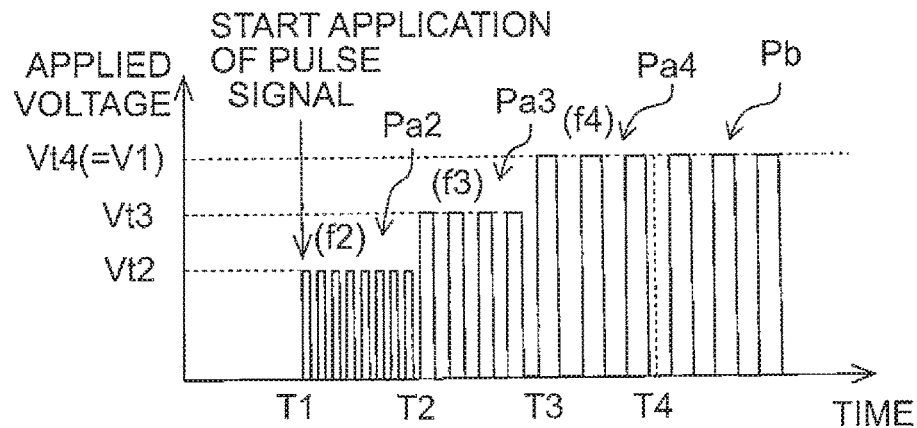

Note that in a case of applying the pulse signal to the active portions 61 from the voltage-raising step of the second stage as depicted in FIGS. 13A to 13C, it is preferable that a frequency f2 (the number of pulses per unit time) of a pulse signal Pa2 applied to the active portion 61 at the voltage-raising step of the second stage is much greater than the frequency f3 of the pulse signal Pa3 applied to the active portion 61 at the voltage-raising step of the third stage.

Figure 14:
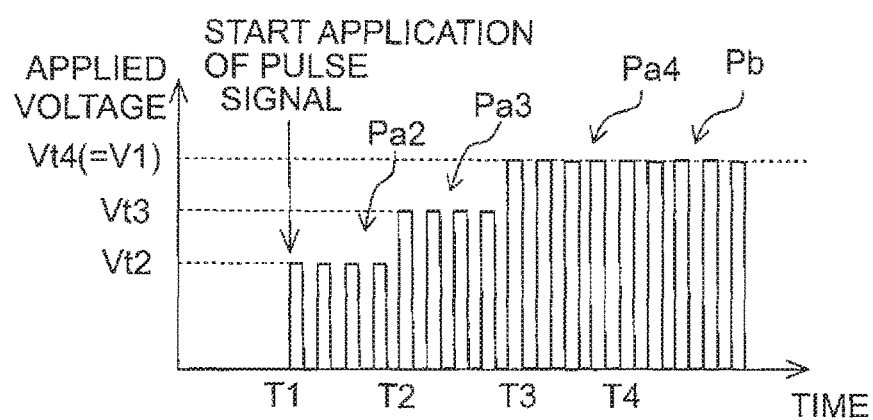
FIG. 14 depicts the change in voltage applied to an active portion of a piezoelectric actuator of a modification of the third embodiment.

In the third embodiment, the number of pulses per unit time for the pulse signal Pa applied to the active portions 61 while the power supply voltage is being raised is made to be greater as the voltage level of the pulse signal Pa is lower. However, as depicted in FIG. 14, the number of pulses per unit time of the pulse signal Pa may be constant while the power supply voltage is being raised. Further, the number of pulses per unit time of the pulse signal Pa may be same as that of the discharge pulse signal Pb.

Modifications Common to First to Third Embodiments

In the first to third embodiments, the power supply voltage having the voltage V1 generated in the voltage generating circuit 22 of the power unit 6 is supplied as it is to the driver IC 71. It is allowable, however, to lower the power supply voltage having the voltage V1 to a voltage lower than the voltage V1 with a voltage lowering circuit, and then to supply the lowered voltage to the driver IC 71.

In the first to third embodiments, the driving element causing the ink to be discharged from the nozzle 40 is exemplified by the active portion 61 (piezoelectric element). However, the driving element in the present teaching is not limited to the piezoelectric element. For example, the present teaching is applicable also to a heating element of a system wherein the heating element is used to heat the ink to generate film boiling, and a droplet of the ink is discharged from the nozzle 40 by the energy brought about by the film boiling. Since the resistance of the heating body is considerably great, the effect of attenuating the voltage fluctuation is high.

In the first to third embodiments, the voltage generating circuit 22 of the power unit 6 functions also as the switching section for supplying the power supply voltage to the driver IC 71. On the other hand, it is allowable to provide a switching section separately from the power unit 6, and such a separate switching section may be provided between the power unit 6 and the driver IC 71 or in the driver IC 71.

The first to third embodiments and modifications thereof as described above are examples in each of which the present teaching is applied to an ink-jet head which jets an ink onto a recording paper to thereby print an image, etc., on the recording paper. However, the present teaching is also applicable to liquid discharging apparatuses usable for various kinds of applications other than the printing of image, etc. For example, the present teaching is applicable also to a liquid discharging apparatus which forms a conductive pattern on a surface of a substrate by discharging a conductive liquid onto the substrate, etc.

What is claimed is:

1. A liquid discharging apparatus configured to discharge liquid, comprising:
    a liquid discharging head having a nozzle, and a driving element configured to cause the liquid to be discharged from the nozzle;
    a driving device configured to apply a voltage to the driving element to drive the driving element;
    a power unit configured to generate the voltage to be applied to the driving device to drive the driving element;
    a switch configured to perform switching of voltage supply by which the voltage is supplied from the power unit to the driving device; and
    a controller configured to:
        control the power unit to raise a power supply voltage of the power unit up to a first voltage in a stepped manner via a plurality of voltage-raising steps, under a condition that the power unit is activated;
        control the switch to start the voltage supply from the power unit to the driving device while the power supply voltage is being raised up to the first voltage; and
        control the driving device to apply the voltage supplied from the power unit to the driving element immediately after the voltage-raising state has proceeded to a final voltage-raising step, of the plurality of voltage-raising steps, in which the power supply voltage is raised to the first voltage.

2. The liquid discharging apparatus according to claim 1, wherein provided that the power supply voltage fluctuates at a period T when the voltage-raising state of the power supply voltage proceeds to the final voltage-raising step, the controller controls the switch to start the voltage supply from the power unit to the driving device after a time half the period T elapses since the voltage-raising state of the power supply voltage has proceeded to the final voltage-raising step.

* * * * *